(12) United States Patent
Kim

(10) Patent No.: US 11,402,853 B2
(45) Date of Patent: Aug. 2, 2022

(54) METHOD FOR CONTROLLING PLATOONING AND AUTONOMOUS VEHICLE BASED ON BLOCKCHAIN

(71) Applicant: LG Electronics Inc., Seoul (KR)

(72) Inventor: Cheolseung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 475 days.

(21) Appl. No.: 16/593,911

(22) Filed: Oct. 4, 2019

(65) Prior Publication Data

US 2020/0033887 A1 Jan. 30, 2020

(30) Foreign Application Priority Data

Aug. 20, 2019 (KR) .......................... 10-2019-0101985

(51) Int. Cl.
*G05D 1/02* (2020.01)
*G05D 1/00* (2006.01)
(Continued)

(52) U.S. Cl.
CPC ......... *G05D 1/0295* (2013.01); *G05D 1/0027* (2013.01); *G07C 5/008* (2013.01);
(Continued)

(58) Field of Classification Search
CPC ............... G05D 1/0295; G05D 1/0027; G05D 2201/0213; G07C 5/008; G07C 5/0841; G07C 5/08; H04L 9/0637; H04L 2209/38; H04L 2209/84; H04L 9/3239; H04L 9/0861; H04L 9/3236; H04L 45/54; G08G 1/22; B60W 2050/0005; B60W 2556/65; B60W 30/165; B60W 30/08; B60W 40/02;
(Continued)

(56) References Cited

U.S. PATENT DOCUMENTS

2019/0378418 A1* 12/2019 Menadue ............. G05D 1/0295
2020/0074061 A1*  3/2020 Kim ..................... G05D 1/0088
(Continued)

FOREIGN PATENT DOCUMENTS

JP     2000348300       12/2000
JP     2019040588        3/2019
(Continued)

OTHER PUBLICATIONS

Korean Notice of Allowance in Korean Appln. No. 10-2019-0101985, dated Jul. 13, 2020, 8 pages (with English translation).

*Primary Examiner* — Donald J Wallace
(74) *Attorney, Agent, or Firm* — Fish & Richardson P.C.

(57) ABSTRACT

Provided are a method for controlling a platooning vehicle based on a blockchain and a platooning vehicle constituting the blockchain. According to a method for controlling a platooning vehicle based on a blockchain according to an embodiment of the present disclosure, it is possible to identify the blockchain data being modulated by comparing a hash value of second block with hash values of the first and third blocks in response to the execution of blockchain agreements. An autonomous vehicle according to the present disclosure may be linked with an artificial intelligence module, a drone (unmanned aerial vehicle (UAV)), a robot, an augmented reality (AR) device, a virtual reality (VR) device, devices related to 5G services, and the like.

19 Claims, 23 Drawing Sheets

(51) Int. Cl.
  *H04L 9/06*  (2006.01)
  *G07C 5/08*  (2006.01)
  *G07C 5/00*  (2006.01)

(52) U.S. Cl.
  CPC .......... *G07C 5/0841* (2013.01); *H04L 9/0637*
    (2013.01); *G05D 2201/0213* (2013.01); *H04L*
    *2209/38* (2013.01); *H04L 2209/84* (2013.01)

(58) Field of Classification Search
  CPC ............... B60W 40/10; B60W 60/001; B60W
            2420/42; B60W 2556/45
  See application file for complete search history.

(56) References Cited

U.S. PATENT DOCUMENTS

2020/0118445 A1* 4/2020 Kim ........................ H04W 4/06
2020/0312154 A1* 10/2020 Mondello ............... H04W 4/46

FOREIGN PATENT DOCUMENTS

| | | | |
|---|---|---|---|
| KR | 101371930 | 3/2014 | |
| KR | 101593850 | 2/2016 | |
| KR | 20190035056 | 4/2019 | |
| WO | WO-2017190794 A1 * | 11/2017 | ............. G06F 21/35 |

\* cited by examiner

FIG. 5
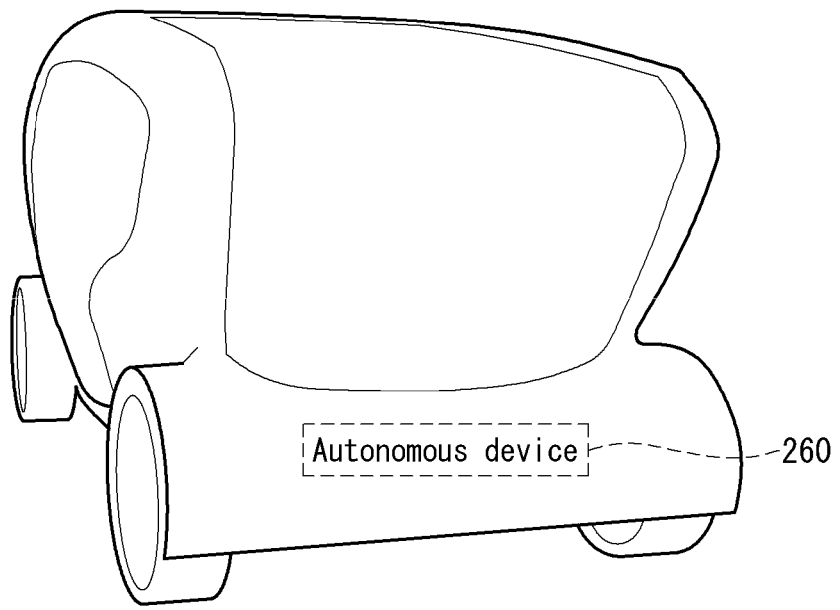
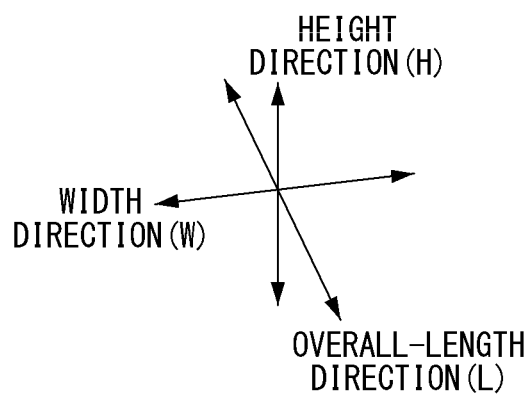

METHOD FOR CONTROLLING PLATOONING AND AUTONOMOUS VEHICLE BASED ON BLOCKCHAIN

CROSS-REFERENCE TO RELATED APPLICATION

This application claims the benefit of Korean Patent Application No. 10-2019-0101985 filed on Aug. 20, 2019, the entire contents of which is incorporated herein by reference for all purposes as if fully set forth herein.

BACKGROUND OF THE INVENTION

Field of the Invention

The present disclosure relates to a method for controlling a platooning vehicle based on a blockchain and a platooning vehicle constituting a blockchain, and more particularly, to a method for controlling a platooning vehicle based on a blockchain capable of improving data security of each vehicle based on a blockchain.

Related Art

Vehicles can be classified into an internal combustion engine vehicle, an external composition engine vehicle, a gas turbine vehicle, an electric vehicle, etc. according to types of motors used therefor.

An autonomous vehicle refers to a self-driving vehicle that can travel without an operation of a driver or a passenger, and automated vehicle & highway systems refer to systems that monitor and control the autonomous vehicle such that the autonomous vehicle can perform self-driving.

The U.S. National Highway Traffic Safety Administration (NHTSA) has announced a law that forces a black box of an autonomous vehicle to be backed up every day since there is a problem of a data modulation of a vehicle such as deleting a recorded image or manipulating a recording time by manipulating a black box when a traffic accident occurs.

SUMMARY OF THE INVENTION

The present disclosure aims to address the above-described needs and/or problems.

In addition, an object of the present disclosure is to implement a method for controlling a platooning vehicle based on a blockchain sharing data using the blockchain.

In addition, an object of the present disclosure is to implement a method for controlling a platooning vehicle based on a blockchain for detecting modulated data by comparing hash values of blockchain data.

In addition, an object of the present disclosure is to implement a method for controlling a platooning vehicle based on a blockchain capable of detecting a vehicle hacked corresponding to external hacking and safely moving the corresponding vehicle.

In an aspect, a method for controlling a plurality of vehicles platooning in an autonomous driving system includes: acquiring driving data of the plurality of platooning vehicles; determining a staying time in a platoon of the vehicles based on the driving data; creating a routing table including a routing sequence for transmitting blockchain data between the plurality of vehicles according to the staying time; transmitting the created routing table to a slave vehicle; forming a blockchain between the plurality of vehicles according to the routing sequence; executing blockchain agreements between a plurality of platooning vehicles participating in a blockchain exchange for distributing event information relate to vehicle operation, and identifying the blockchain data being modulated by comparing a hash value of second block with hash values of the first and third blocks in response to the execution of blockchain agreements, wherein the second block is the block which is subject to data modulating inspection, the first and the third blocks are closest blocks to the second block based on the routing sequence.

The driving data may include at least one of a position at which the plurality of vehicles are separated from the platoon, an amount of fuel remaining in the vehicle, a year model of the vehicle, a size of the vehicle, a type of the vehicle, or a position of the vehicle in the platoon.

In the block, at least one of the driving data, sensing data of the vehicle, autonomous driving control data of the vehicle, or external object data acquired by a camera of the vehicle may be encrypted The forming of the blockchain may include: transmitting and receiving the driving data between the plurality of vehicles; encrypting the driving data of a leading vehicle with a V2X key; calculating the hash value based on the encrypted driving data and forming the block formed of the encrypted driving data and the hash value; and transmitting the block to the vehicle corresponding to a subsequent sequence according to the routing sequence.

The method may further include: identifying an event which causes a hazard to driving or is highly likely to cause a hazard to driving based on external information of the vehicle which is acquired by a camera of the vehicle; and controlling a generation speed of the blockchain according to a degree of danger when the event is identified.

The method may further include: transmitting the blockchain data related to the event to a server when the event is identified.

The event may include at least one of a dangerous situation in which where the vehicle is likely to crash on a road, a situation in which where the platooning vehicles do not respond to a control signal of a leading vehicle, or a situation in which where it is determined that the blockchain data are modulated.

The method may further include: determining whether the blockchain data are modulated at a predetermined period and transmitting the determined blockchain data to a server.

When the blockchain data of the platooning vehicle is consecutively modulated and transmitted, the vehicle transmitting the modulated data may be determined to be a vehicle which is likely to be hacked and the routing sequence may be changed to a subsequent rank.

The method may further include: requesting unmodulated blockchain data to the server when it is determined that the blockchain data are modulated; and updating the blockchain data, which are determined to be modulated, based on the unmodulated blockchain data The method may further include: receiving a join request message to the platoon from the new vehicle when a new vehicle join the platoon; determining a position of the new vehicle in the platoon and transmitting the join request message to the platoon to the new vehicle; and recreating the routing table according to the staying time in the platoon of the new vehicle.

The method may further include: sensing a resource for sidelink mode 4 transmission in a first window; selecting the resource for the mode 4 transmission in a second window based on the sensed result; transmitting SCI format 1 for scheduling of a blockchain data transmission of a leading vehicle to the slave vehicle on PSCCH based on the selected resource; and transmitting the blockchain data of the leading vehicle to the slave vehicle on PSSCH.

In another aspect, a platooning leading vehicle constituting a blockchain includes: a communication module; a memory; and a processor; in which the communication module may transmit a routing table and driving data to a slave vehicle and receive the driving data from the slave vehicle, and the processor may determine a staying time in the platoon of the vehicle based on the driving data of at least one of the platooning vehicles, create the routing table including a routing sequence transmitting blockchain data between the plurality of vehicles according to the staying time, form a blockchain between the plurality of vehicles based on the routing sequence, executes blockchain agreements between a plurality of platooning vehicles participating in a blockchain exchange for distributing event information relate to vehicle operation, and identifies the blockchain data being modulated by comparing a hash value of second block with hash values of the first and third blocks in response to the execution of blockchain agreements, wherein the second block is the block which is subject to data modulating inspection, the first and the third blocks are closest blocks to the second block based on the routing sequence.

The effect of the method for controlling a platooning vehicle based on a blockchain according to an embodiment of the present disclosure will be described as follows.

The present disclosure can share and transfer data using the blockchain.

In addition, the present disclosure can detect the modulated data by comparing the hash values of the blockchain data.

In addition, the present disclosure can detect the hacked vehicle corresponding to the external hacking and can safely move the corresponding vehicle.

Effects which can be achieved by the present disclosure are not limited to the above-mentioned effects. That is, other objects that are not mentioned may be obviously understood by those skilled in the art to which the present disclosure pertains from the following description.

BRIEF DESCRIPTION OF THE DRAWINGS

FIG. 5 shows a vehicle according to an embodiment of the present disclosure.

The accompanying drawings, which are included as part of the detailed description to assist understanding of the invention, illustrate embodiments of the invention and explain the technical features of the invention together with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
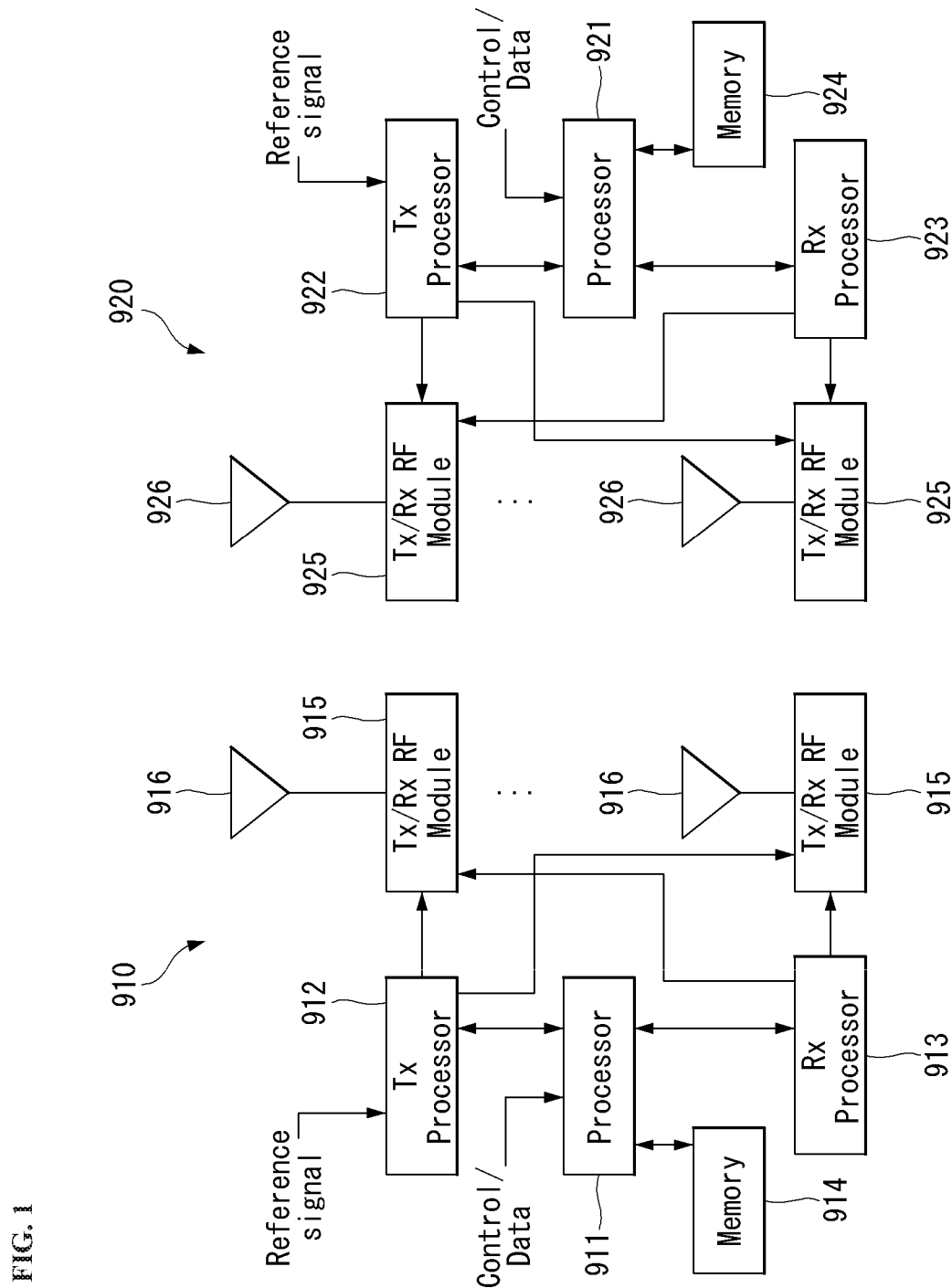
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
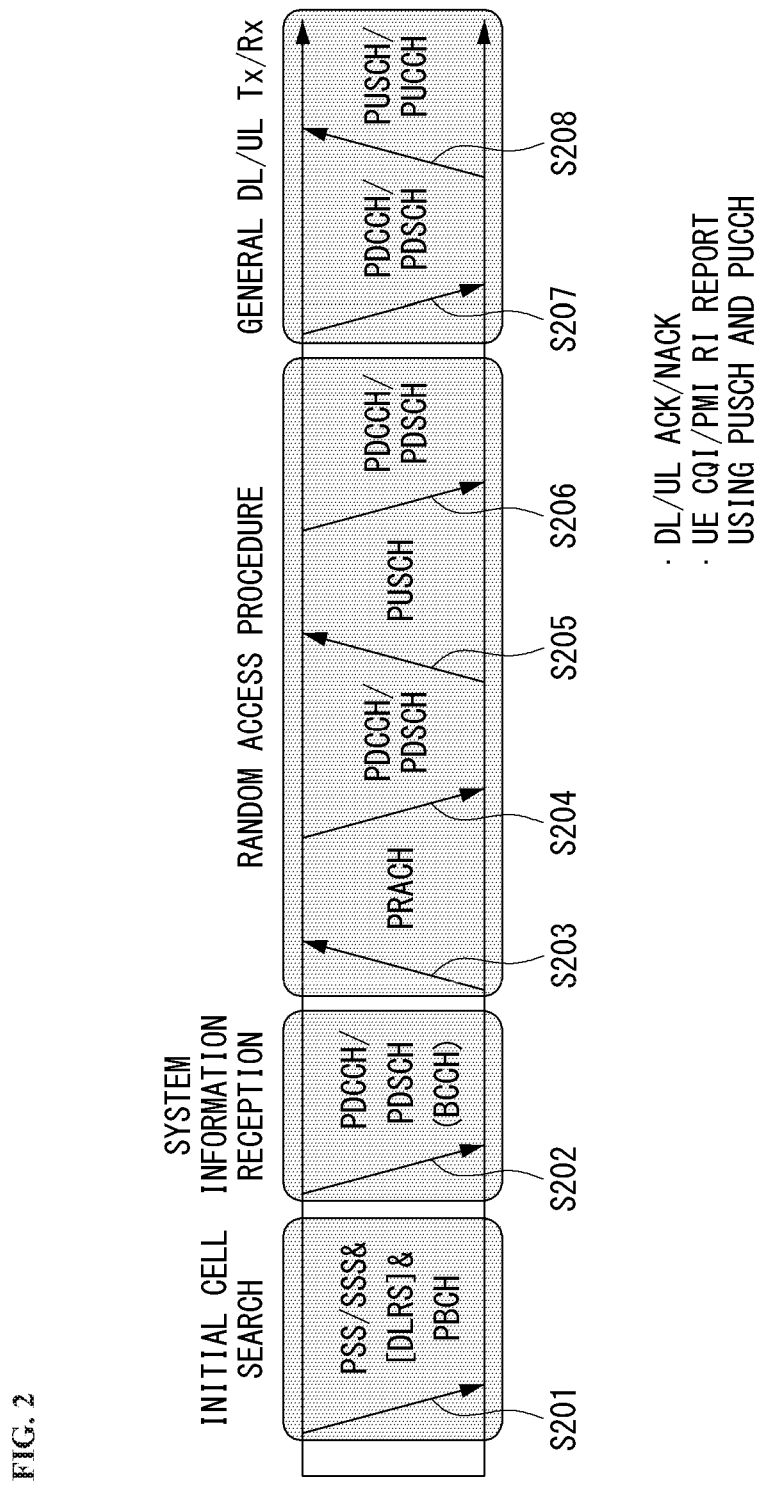
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent path loss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter.

When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'CON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
  - When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format $2_{-1}$. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation between Autonomous Vehicles Using 5G Communication

Figure 3:
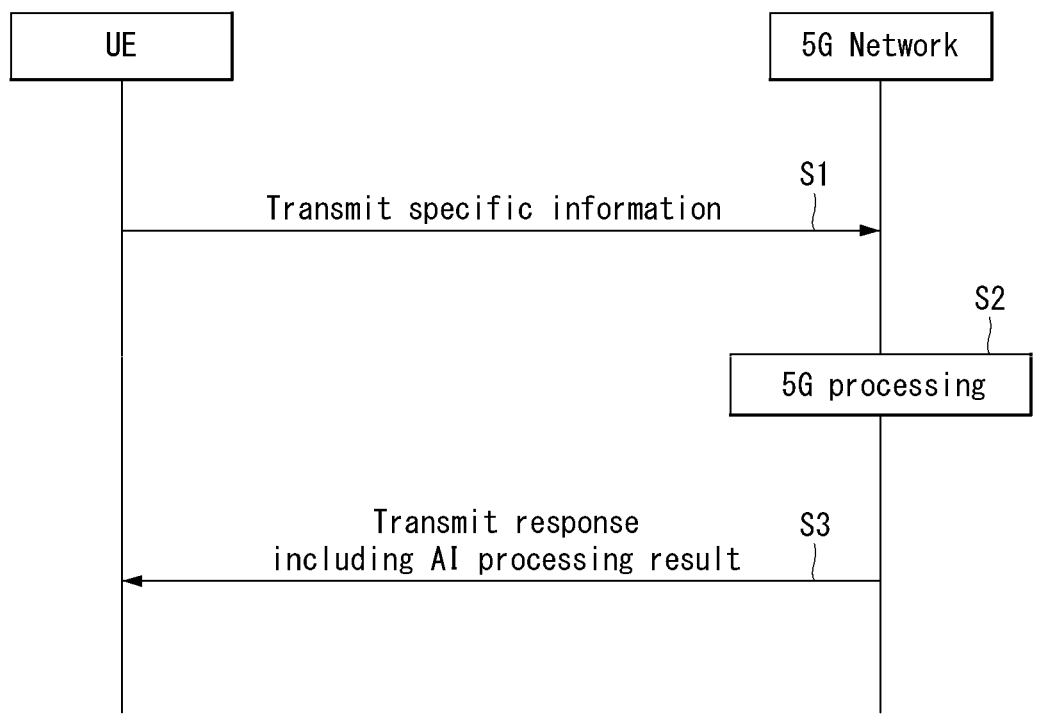
FIG. 3 shows an example of basic operations of an autonomous vehicle and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

H. Autonomous Driving Operation between Vehicles Using 5G Communication

Figure 4:
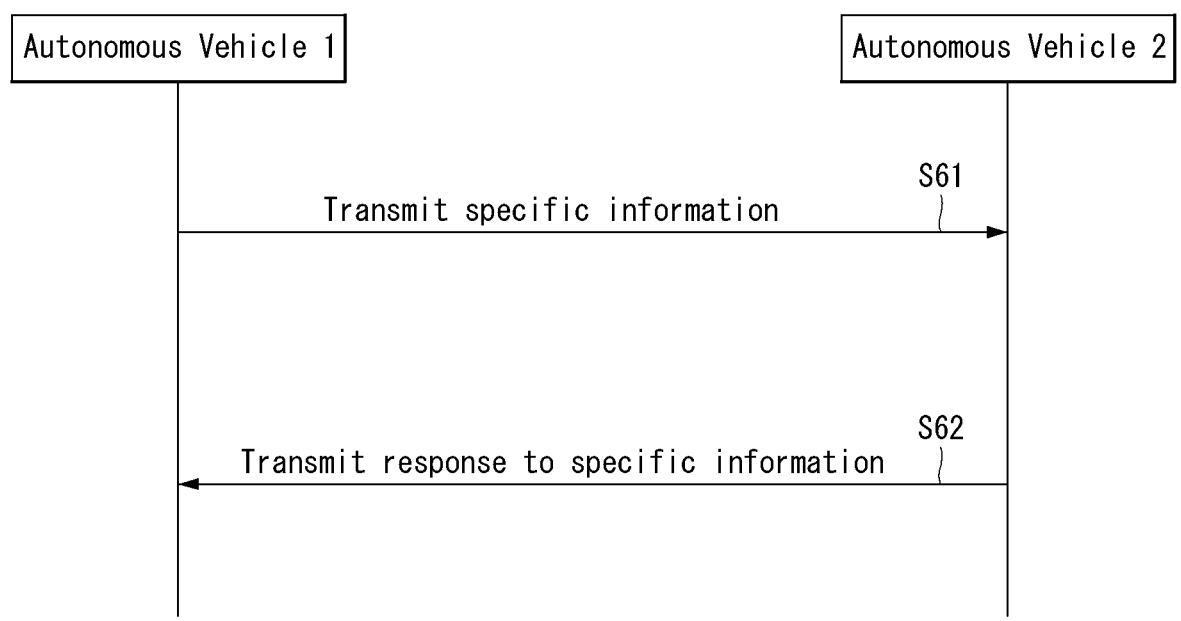
FIG. 4 shows an example of a basic operation between vehicles using 5G communication.

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (side-link communication transmission mode 3) or indirectly (side-link communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network can transmit DCI format 5A to the first vehicle for scheduling of mode-3 transmission (PSCCH and/or PSSCH transmission). Here, a physical side-link control channel (PSCCH) is a 5G physical channel for scheduling of transmission of specific information a physical side-link shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

The above-described 5G communication technology can be combined with methods proposed in the present disclosure which will be described later and applied or can complement the methods proposed in the present disclosure to make technical features of the methods concrete and clear.

Driving (1) Exterior of Vehicle

FIG. 5 is a diagram showing a vehicle according to an embodiment of the present disclosure.

Referring to FIG. 5, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 6:
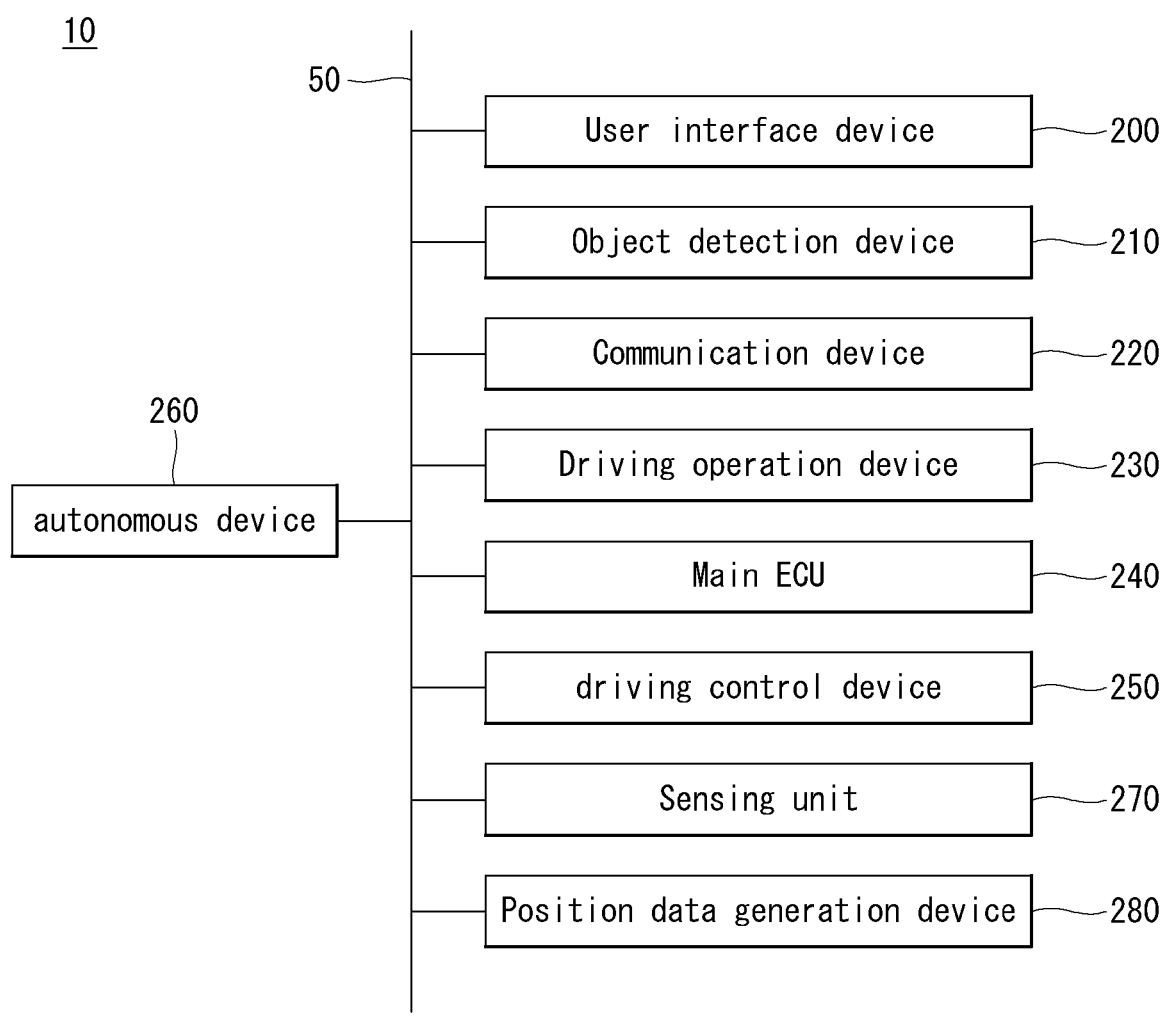
FIG. 6 is a control block diagram of the vehicle according to an embodiment of the present disclosure.

FIG. 6 is a control block diagram of the vehicle according to an embodiment of the present disclosure.

Referring to FIG. 6, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

For example, the communication device can exchange signals with external devices on the basis of C-V2X (Cellular V2X). For example, C-V2X can include side-link communication based on LTE and/or side-link communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

Figure 7:
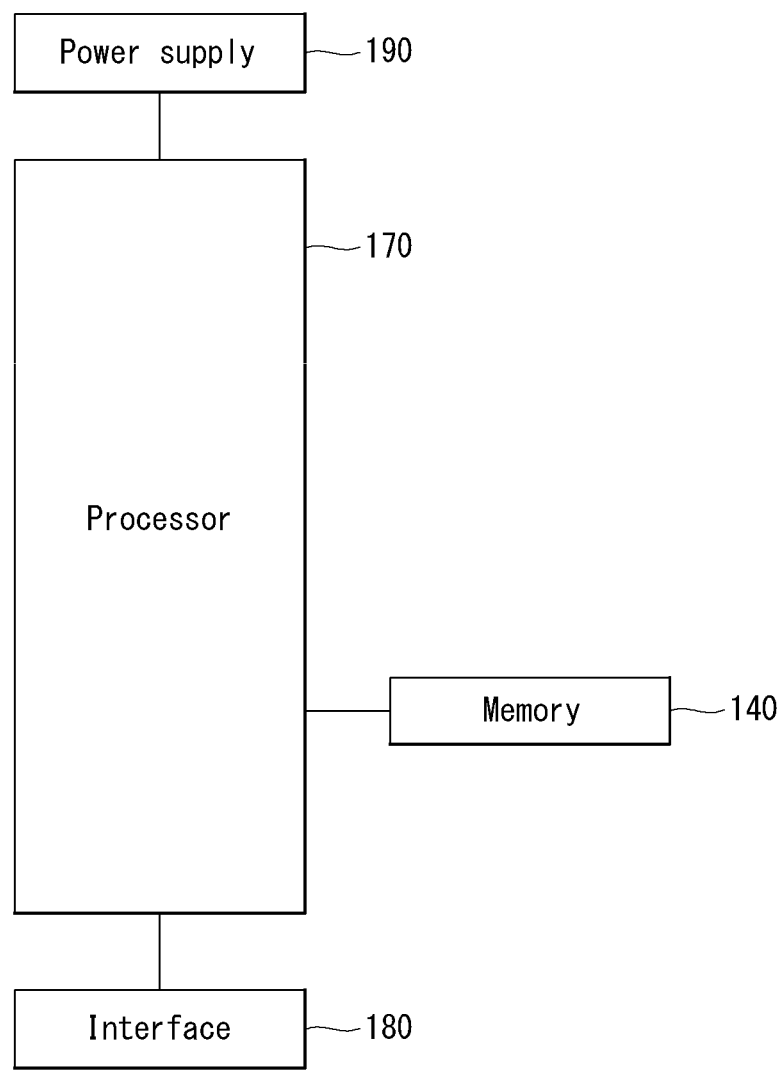
FIG. 7 is a control block diagram of an autonomous device according to an embodiment of the present disclosure.

FIG. 7 is a control block diagram of the autonomous device according to an embodiment of the present disclosure.

Referring to FIG. 7, the autonomous device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous device 260. The power supply 190 can be provided with power from a power source (e.g., a battery) included in the vehicle 10 and supply the power to each unit of the autonomous device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

Figure 8:
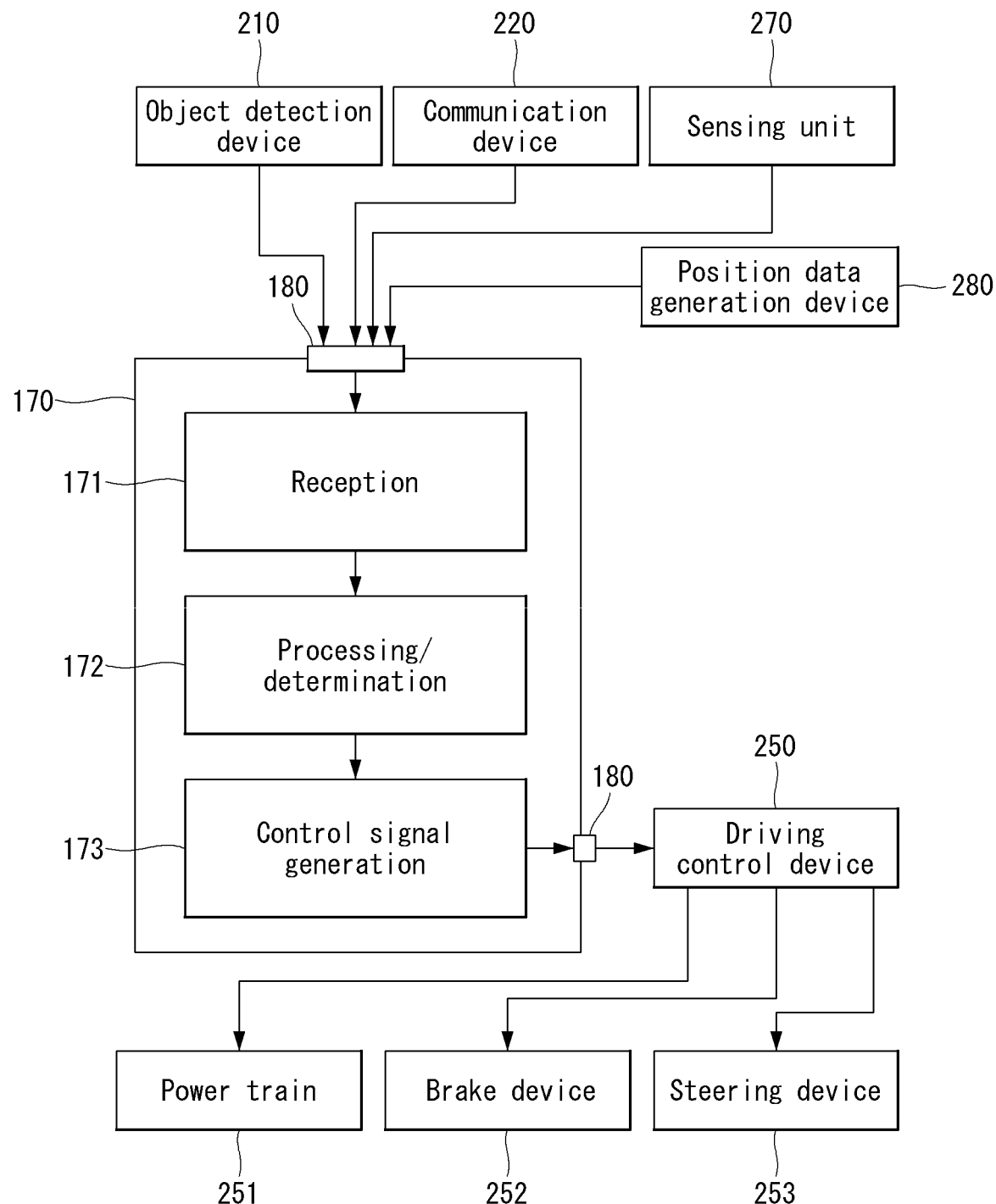
FIG. 8 is a diagram showing a signal flow in an autonomous vehicle according to an embodiment of the present disclosure.

FIG. 8 is a diagram showing a signal flow in an autonomous vehicle according to an embodiment of the present disclosure.

1) Reception Operation

Referring to FIG. 8, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 253.

Autonomous Vehicle Usage Scenario

Figure 9:
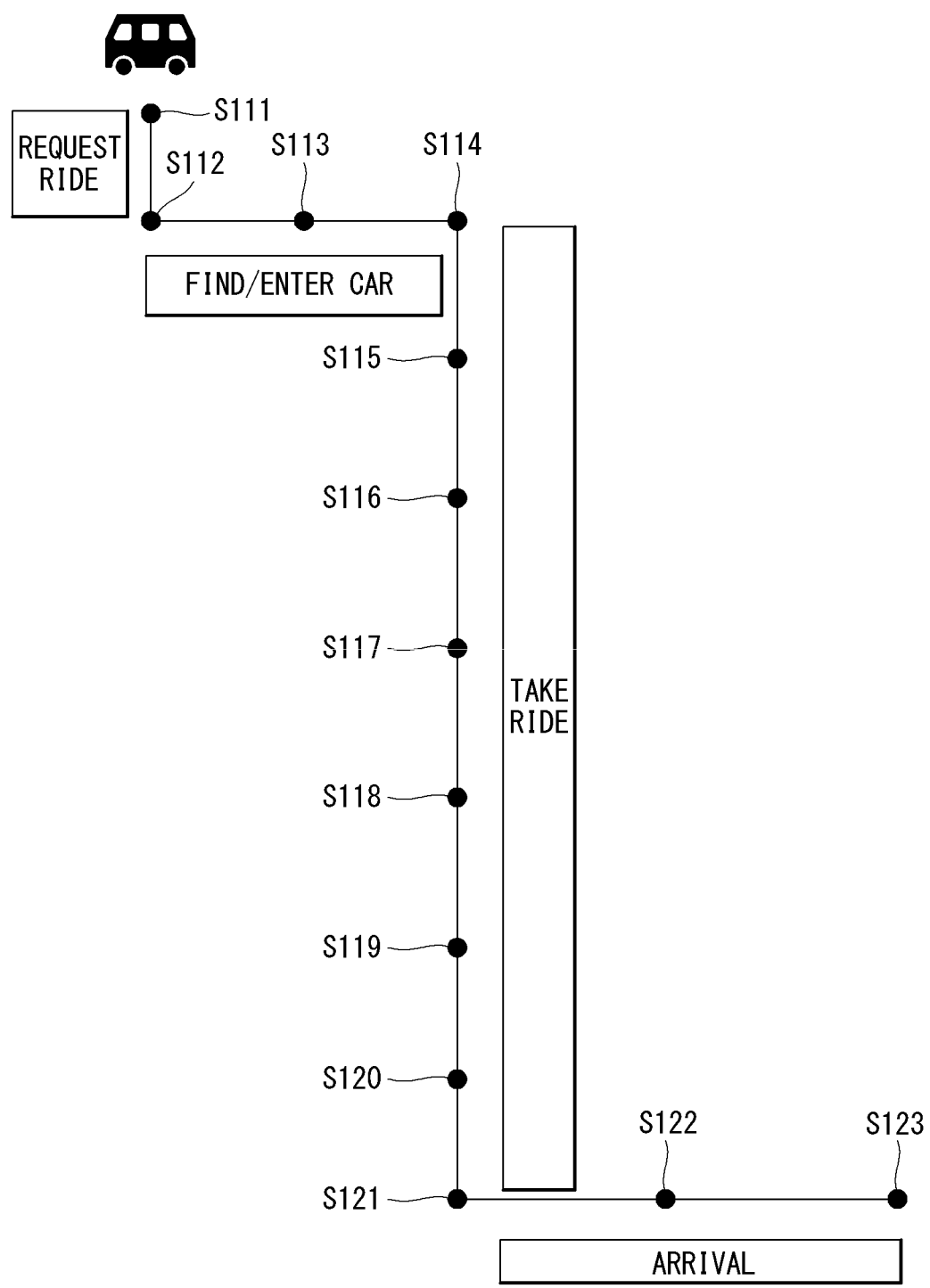
FIG. 9 is a diagram referred to describe a usage scenario of a user according to an embodiment of the present disclosure.

FIG. 9 is a diagram referred to describe a usage scenario of the user according to an embodiment of the present disclosure.

1) Destination Forecast Scenario

A first scenario S111 is a destination forecast scenario of the user. A user terminal may install an application that can be linked with a cabin system 300. The user terminal can forecast the destination of the user through the application based on user's contextual information. The user terminal may provide vacant seat information in a cabin through the application.

2) Cabin Interior Layout Countermeasure Scenario

A second scenario S112 is a cabin interior layout countermeasure scenario. The cabin system 300 may further include a scanning device for acquiring data on the user located outside a vehicle 300. The scanning device scans the user and can obtain physical data and baggage data of the user. The physical data and baggage data of the user can be used to set the layout. The physical data of the user can be used for user authentication. The scanning device can include at least one image sensor. The image sensor can use light in a visible light band or an infrared band to acquire an image of the user.

The seat system 360 can set the layout in the cabin based on at least one of the physical data and baggage data of the user. For example, the seat system 360 may provide a baggage loading space or a seat installation space.

3) User Welcome Scenario

A third scenario S113 is a user welcome scenario. The cabin system 300 may further include at least one guide light. The guide light may be disposed on a floor in the cabin. The cabin system 300 may output the guide light such that the user is seated on the seat, which is already set among the plurality of sheets when user's boarding is detected. For example, a main controller 370 may implement moving light through sequential lighting of a plurality of light sources according to the time from an open door to a predetermined user seat.

4) Seat Adjustment Service Scenario

A fourth scenario S114 is a seat adjustment service scenario. The seat system 360 may adjust at least one element of the seat that matches the user based on the acquired physical information.

5) Personal Content Provision Scenario

A fifth scenario S115 is a personal content provision scenario. A display system 350 can receive personal data of the user via an input device 310 or a communication device 330. The display system 350 can provide a content corresponding to the personal data of the user.

6) Product Provision Scenario

A sixth scenario S116 is a product provision scenario. A cargo system 355 can receive user data through the input device 310 or the communication device 330. The user data may include preference data of the user and destination data of the user. The cargo system 355 may provide a product based on the user data.

7) Payment Scenario

A seventh scenario S117 is a payment scenario. A payment system 365 can receive data for price calculation from at least one of the input device 310, the communication device 330 and the cargo system 355. The payment system 365 can calculate a vehicle usage price of the user based on the received data. The payment system 365 can require the user (that is, mobile terminal of user) to pay a fee at the calculated price.

8) User Display System Control Scenario

An eighth scenario S118 is a user display system control scenario. The input device 310 may receive a user input configured in at least one form and may convert the user input into an electrical signal. The display system 350 can control a content displayed based on the electrical signal.

9) AI Agent Scenario

A ninth scenario S119 is a multi-channel artificial intelligence (AI) agent scenario for multiple users. An AI agent 372 can distinguish the user input of each of multiple users. The AI agent 372 can control at least one of the display system 350, the cargo system 355, the seat system 360, and the payment system 365 based on the electric signal converted from the user input of each of the multiple users.

10) Multimedia Content Provision Scenario for Multiple Users

A tenth scenario S120 is a multimedia content provision scenario for multiple users. The display system 350 can provide a content that all users can view together. In this case, the display system 350 can individually provide the same sound to multiple users through a speaker provided in each sheet. The display system 350 can provide a content that the multiple users individually can view. In this case, the display system 350 can provide an individual sound through the speaker provided in each sheet.

11) User Safety Securing Scenario

An eleventh scenario S121 is a user safety securing scenario. When vehicle peripheral object information that poses a threat to the user is acquired, the main controller 370 can control to output an alarm of the vehicle peripheral object via the display system 350.

12) Belongings Loss Prevention Scenario

A twelfth scenario S122 is a scenario for preventing loss of belongings of the user. The main controller 370 can obtain data on the belongings of the user via the input device 310. The main controller 370 can obtain user motion data through the input device 310. The main controller 370 can determine whether the user places the belongings and gets off based on the data of the belongings and the motion data. The main controller 370 can control to output an alarm of the belongings through the display system 350.

13) Get Off Report Scenario

A thirteenth scenario S123 is a get off report scenario. The main controller 370 can receive get off data of the user through the input device 310. After the user gets off, the main controller 370 can provide report data for the get off to the mobile terminal of the user through the communication device 330. The report data may include the entire usage fee data of the vehicle 10.

Vehicle-to-Everything (V2X)

Figure 10:
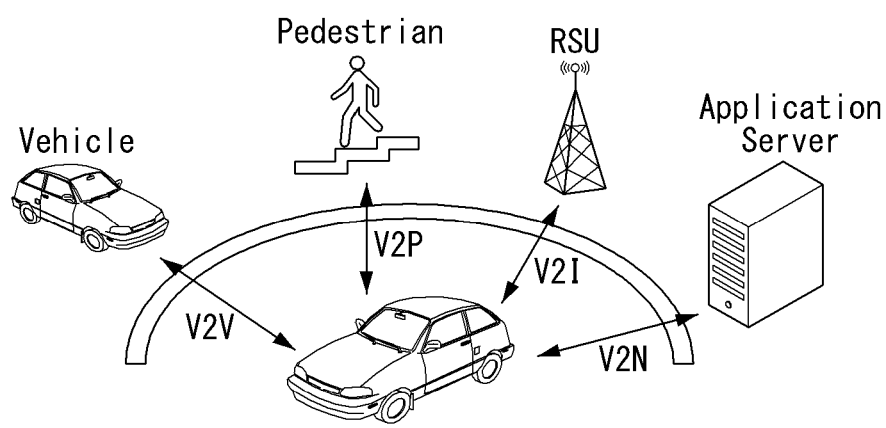
FIG. 10 is an example of V2X communication to which the present disclosure is applicable.

FIG. 10 is an example of V2X communication to which the present disclosure is applicable.

The V2X communication includes communication between a vehicle and all objects such as Vehicle-to-Vehicle (V2V) referring to communication between vehicles, Vehicle-to-Infrastructure (V2I) referring to communication between a vehicle and an eNB or a Road Side Unit (RSU), and Vehicle-to-Pedestrian (V2P) or a Vehicle-to-Network (V2N) referring to communication between a vehicle and a UE with an individual (pedestrian, bicycler, vehicle driver, or passenger).

The V2X communication may indicate the same meaning as V2X side-link or NR V2X, or may include a broader meaning including the V2X side-link or NR V2X.

For example, the V2X communication can be applied to various services such as forward collision warning, an automatic parking system, a cooperative adaptive cruise control (CACC), control loss warning, traffic matrix warning, traffic vulnerable safety warning, emergency vehicle warning, speed warning on a curved road, or a traffic flow control.

The V2X communication can be provided via a PC5 interface and/or a Uu interface. In this case, in a wireless communication system that supports the V2X communication, there may exist a specific network entity for supporting the communication between the vehicle and all the objects. For example, the network object may be a BS (eNB), the road side unit (RSU), a UE, an application server (for example, a traffic safety server), or the like.

In addition, the UE executing V2X communication includes not only a general handheld UE but also a vehicle UE (V-UE), a pedestrian UE, a BS type (eNB type) RSU, a UE type RSU, a robot having a communication module, or the like.

The V2X communication may be executed directly between UEs or may be executed through the network object(s). V2X operation modes can be divided according to a method of executing the V2X communication.

The V2X communication requires a support for UE pseudonymity and privacy when a V2X application is used so that an operator or a third party cannot track a UE identifier within a V2X support area.

Terms frequently used in the V2X communication are defined as follows.

Road Side Unit (RSU): The RSU is a V2X serviceable device that can perform transmission/reception with a moving vehicle using a V2I service. Furthermore, the RSU can exchange messages with other entities supporting the V2X application as a fixed infrastructure entity supporting the V2X application. The RSU is a term often used in the existing ITS specifications, and a reason for introducing this term in 3GPP specifications is to make it easy to read a document in an ITS industry. The RSU is a logical entity that combines a V2X application logic with functions of a BS (referred to as BS-type RSU) or a UE (referred to as UE-type RSU).

V2I service: A type of V2X service in which one is a vehicle and the other is an entity belongs to an infrastructure.

V2P service: A type of the V2X service in which one is a vehicle and the other is a device (for example, handheld UE carried by pedestrian, bicycler, driver, or passenger) carried by an individual.

V2X service: A 3GPP communication service type in which a transmitting or receiving device is related to a vehicle.

V2X enabled UE: A UE supporting the V2X service.

V2V service: A type of the V2X service in which both in the communication are vehicles.

V2V communication range: A range of direct communication between two vehicles participating in the V2V service.

As described above, the V2X application referred to as the V2X (Vehicle-to-Everything) includes four types such as (1) Vehicle-to-Vehicle (V2V), (2) Vehicle-to-infrastructure (V2I), (3) Vehicle-to-Network (V2N), and (4) Vehicle-to-Pedestrian (V2P).

Figure 11A:
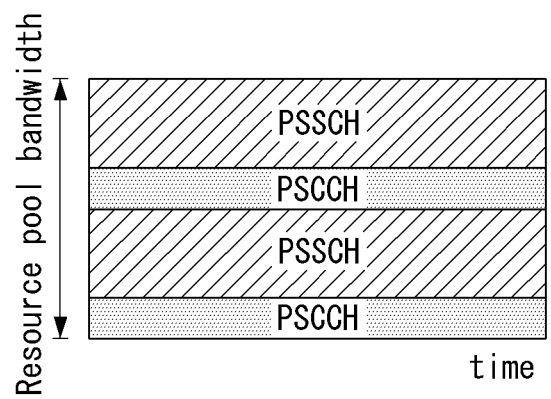
FIGS. 11A and 11B show a resource allocation method in a side-link where the V2X is used.
Figure 11B:
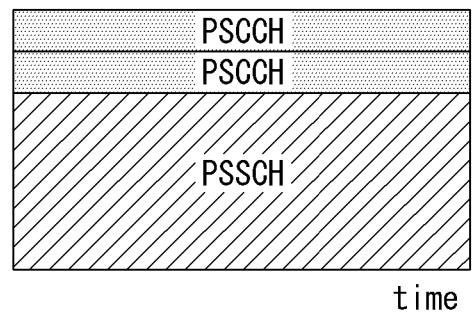

FIGS. 11A and 11B shows a resource allocation method in a side-link where the V2X is used.

In the side-link, different physical side-link control channels (PSCCHs) may be separately allocated in a frequency domain, and different physical side-link shared channels (PSSCHs) may be separately allocated. Alternatively, different PSCCHs may be allocated consecutively in the frequency domain, and PSSCHs may also be allocated consecutively in the frequency domain.

NR V2X

In order to extend a 3GPP platform to a vehicle industry during 3GPP release 14 and 15, supports for the V2V and V2X services are introduced in LTE.

Requirement for supports with respect to an enhanced V2X use case are broadly divided into four use case groups.

(1) A Vehicle Platooning can dynamically form a platoon in which vehicles move together. All vehicles in the platoon get information from the top vehicle to manage this platoon. These pieces of information allow the vehicles to be operated in harmony in the normal direction and to travel together in the same direction.

(2) Extended sensors can exchange raw data or processed data collected by a local sensor or a live video image in a vehicle, a road site unit, a pedestrian device, and a V2X application server. In the vehicle, it is possible to raise environmental awareness beyond what a sensor in the vehicle can sense, and to ascertain broadly and collectively a local situation. A high data transmission rate is one of main features.

(3) Advanced driving allows semi-automatic or full-automatic driving. Each vehicle and/or the RSU shares own recognition data obtained from the local sensor with a proximity vehicle and allows the vehicle to synchronize and coordinate a trajectory or maneuver. Each vehicle shares a driving intention with the proximity vehicle.

(4) Remote driving allows a remote driver or the V2X application to drive the remote vehicle for a passenger who cannot drive the remote vehicle in his own or in a dangerous environment. If variability is restrictive and a path can be forecasted as public transportation, it is possible to use Cloud computing based driving. High reliability and a short waiting time are important requirements.

The above-described 5G communication technology can be applied in combination with methods proposed in the present disclosure described later or can be supplemented to embody or clarify technical features of methods proposed in the present disclosure.

Hereinafter, various embodiments of the present disclosure will be described in detail with reference to the accompanying drawings.

Figure 12:
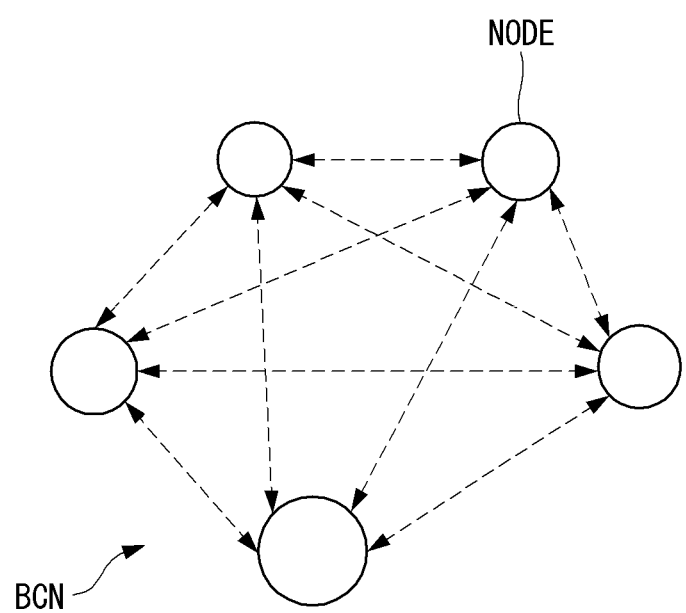
FIG. 12 is a drawing schematically showing a blockchain.

FIG. 12 is a drawing schematically showing a blockchain.

Block chain is a computing technology designed to make it difficult for malicious forces to arbitrarily manipulate by all the members verifying, storing and executing information and values over the network.

A key technology of the blockchain is the structure in which each keeps transaction records or information without the help of a third organization (Clearing House or Trusted Third Party, TTP) and transactions are established only at the time of joint authentication by the members. A blockchain is a block aggregate that connects blocks containing a number of transaction records and information, and is a chain structure in which each block is organically linked to a previous block by a hash value until the genesis block.

At this time, the block means a type of data packet that is connected chronologically by encrypting the contents of the information in a form of letters or numbers. A Block containing new information is connected at every certain time, and by verifying its validity in the process of block-to-block connection, it is possible to prevent falsification of information inside the blockchain.

Types of blockchains include Public Block Chain, Private Block Chain, Consortium Block Chain and the like.

The public blockchain, which is the first blockchain application case, may be opened and operated to everyone through the Internet, allows anyone to participate in notarization, and has characteristics holding cross-anonymity. The private blockchain is an individual type blockchain that only permitted users can access. A single entity may manage its internal network with blockchain and provide a platform service for developing corresponding chain. The consortium blockchain is an anti-central blockchain, which only a small number of pre-selected entities can participate in. There is a nature of participating in notarization through agreed rules among the entities, and of network scalability being excellent.

In the specification, the "blockchain" also refers to the public blockchain, the private blockchain or the consortium blockchain.

The core technology of blockchain is configured with four base technologies, such as a peer-to-peer (P2P) network, encryption, distributed ledger, and distributed agreement. Each technology is formed in a relation complementary to each other for decentralization, data integrity, or the like. Hereinafter, a blockchain technology which is combined with the key technologies of blockchain and the autonomous driving technology of a vehicle will be described.

P2P Network

Communication and connection between participants of the blockchain may be formed based on a P2P network. The P2P network is defined as an autonomous configuration system formed with autonomous peers with equivalent qualifications for the purpose of sharing distributed resources without the concept of centralized services.

P2P networks are largely classified as a structured P2P or a unstructured P2P. The unstructured P2P may further be classified as a 'centralized P2P network' that forms a network between participants around the server or a 'distributed P2P network' that is based on the flooding algorithm of the data. The Blockchain may use, but not limited to a flooding-based unstructured P2P network for the implementation of a decentralized distributed network.

The main characteristics of the P2P network are as follows: In terms of distributed resource sharing, the target resources of interest may be used in a distributed form, and may be located at a network end close to the peer. Each peer in a set of peers utilizes the resources provided by its counterpart peer, and the target resources include audio/video data, applications, computing power, computing resources, and so on. Peers are linked to each other by a network and can be distributed across the globe. In terms of distributed autonomous organization, each peer directly interacts with each other without separate centralized control or intervention for the use of shared resources. In terms of performance, there may be a case in which a centralization factor is introduced into a fully distributed P2P network, which is called a hybrid P2P network. For this, the server may be used as a centralization element, and especially a Mobile Edge Computing (MEC) server may take a role of it. Further, the hybrid P2P network with a certain peer as a centralization element may be configured. In the P2P network, each peer provides flexibility in terms of function availability by taking both roles of a client and a server. In addition, respective peers have equal qualification in terms of their functional role. Whether to share resources held by each peer or not follows the autonomous decision of the peer. In particular, in the invention, each of peers may be configured with an autonomous vehicle.

Encryption

In the encryption technology used in the blockchain, Merckle Tree technique and Digital Signature technique based on a public key may be used.

Figures 13A, 13B:
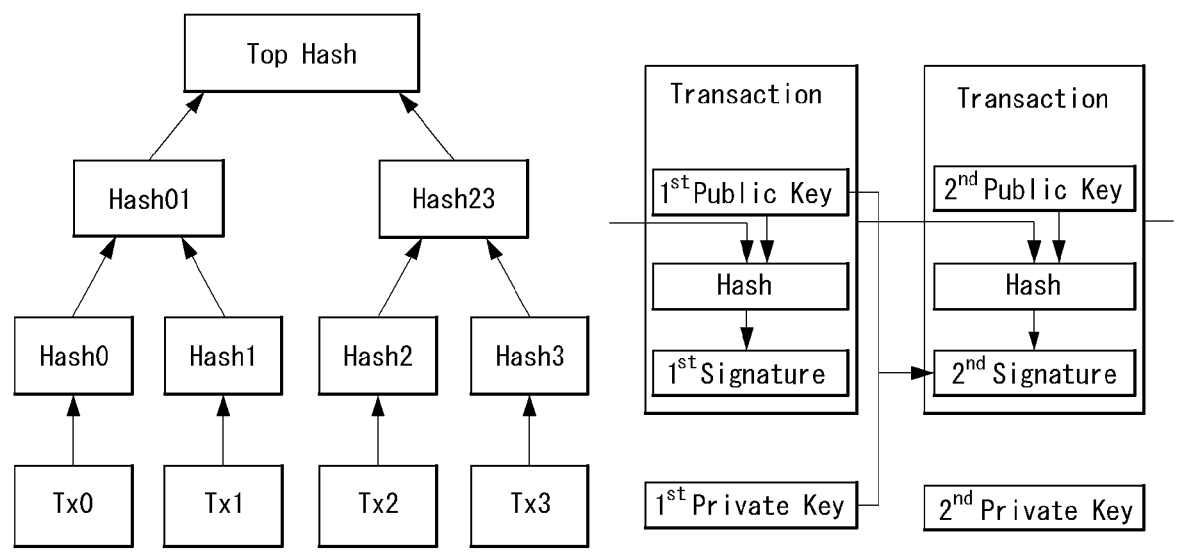
FIG. 13A is a drawing representing a Muckle Tree method in blockchain encryption technology.
FIG. 13B is a drawing illustrating a digital signature method based on a public key in the blockchain encryption technology.

FIG. 13A is a drawing representing a Muckle Tree method in blockchain encryption technology.

Referring to FIG. 13A, the Merkle tree is a kind of hash tree, and refers to a tree in which names of all the non-leaf nodes are configured with hashes of children nodes. A leaf node means data of a file or a specific value, and an upper node is configured with a hash of such leaf node. A root node of the muckle tree configured in this way may be formed of hash values of data of all the nodes constituting the tree. At this time, users can verify falsification of data only by verifying the hash of the root node. Therefore, in the blockchain, the foundation of the Merkle tree may be formed by inserting information about transaction or the like between participants into the leaf node. As a function used when forming the Merkle tree, there is SHA-256, but the configuration of the invention is not limited to this.

FIG. 13B is a drawing illustrating a digital signature method based on a public key in the blockchain encryption technology.

Referring to FIG. 13B, an open key-based digital signature technique may be used in a field such as self-authentication or the like as an encryption technology that enables secure communication between participants who do not divide and have a secret key beforehand. In a public key based structure, there are a public key and a secret key, and the public key can be known by all participants, whereas the secret key can only be known by the corresponding owner. The user uses his/her own secret key to sign transaction and send transaction information to the blockchain network with his/her own corresponding public key. Later, other participants may verify the transaction validity through the public key of the sender.

Distributed Ledger

The distributed ledger is a memory of information that is replicated, shared and synchronized by agreement between participants. In order to apply the distributed ledger to the P2P network, consent of participants is required, and this is the same to the blockchain. In the blockchain, the distributed ledger stores all the occurring information through verification by participants, and all participants can hold the same information. When verifying information, only legitimate information is stored in the distributed ledger of the blockchain, after verifying the information and connectivity recorded in the distributed ledger held by the individual participants, and agreement of the participants.

At this time, information is accumulated for a period of time and stored on a block-by-block basis, and is stored on the distributed ledger with connectivity between blocks bestowed. The distributed ledger becomes a ground of the integrity of the data provided by the blockchain. The users who participate in the blockchain possess data of the same distributed ledger, and may exhibit better security effect against outside hacking or fabrication by a specific user. For example, in a case where a hacker attempts to falsify certain data, do double transaction or the like from outside, high costs and computing resources would be consumed because the hacking should be attempted for a majority of the distributed ledger owned by participants.

Distributed Agreement

Distributed agreement is protocol that elicits consent for specific data between processes or agents when there is a process having a combination in a field such as distributed computing, multi-agent system or the like. The distributed agreement protocol has properties of validity, integrity, agreement, and termination.

In the agreement algorithm, a proof of work (PoW) algorithm, a proof of stake (PoS) algorithm, a Delegated Proof of Stake (DPoS) algorithm, a Practical Byzntine Fault Tolerance (PBFT) algorithm, a Proof of Elapsed Time (PoET) algorithm, a Proof of Importance algorithm, a Proof of Authority (PoA) algorithm or the like may be used, and any designed algorithm other than these may be used.

Autonomous Driving of a Vehicle Using Blockchain

Figure 14:
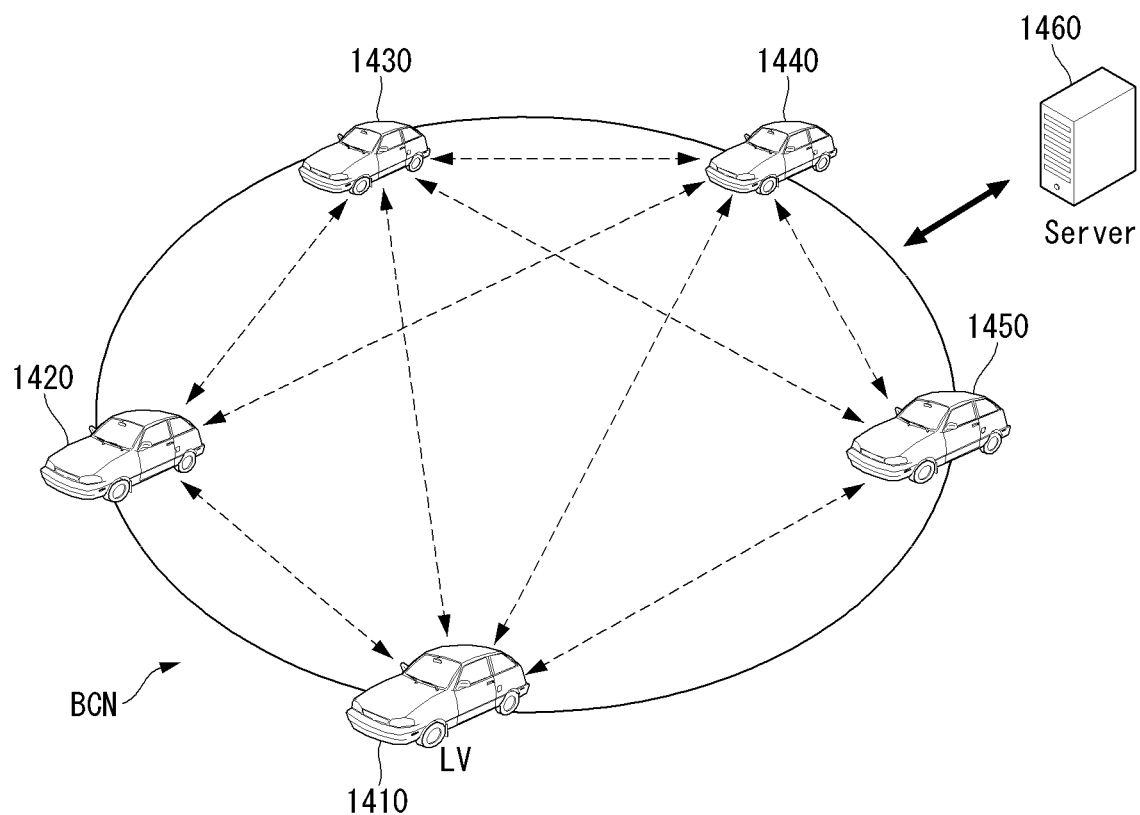
FIG. 14 is a drawing showing blockchain with an autonomous vehicle as a node.

FIG. 14 is a drawing showing blockchain with an autonomous vehicle as a node.

Generation 1 blockchain and generation 2 blockchain recorded only cryptocurrency or simple transaction records on the block and used them, but the generation 3 blockchain can generate data by adding data and programming codes as its processing speed is improved and its storage capacity is increased. Therefore, blockchains can also be used in autonomous driving or IoT of a vehicle beyond financial transactions.

However, the scalability of the blockchain is too low to be directly applied to a vehicle system, and there may be a problem with throughput. As a result, a light blockchain may be used in an autonomous vehicle or Internet of Things (IoT). There is an LSB (Lightweight Scalable Blockchain) as a blockchain system that has been made lighter. The LSB is for a large scale network environment configured with nodes having limited computation capability, and at least one autonomous vehicle or IoT may participate therein. Respective nodes on the LSB network constitute a cluster by being gathered to a certain number, and one node serves as a cluster head. At this time, the cluster head can create and store a block of the blockchain.

At this time, other nodes participating in the cluster may perform only verification of the stored block. A node corresponding to the cluster head in the LSB may be referred to as an Overlay Block Manager (OBM). Respective transactions constituting a blockchain are transmitted, received and verified between OBMs, and there is no central control system like a regular blockchain. In fact, only the OBM participates in blockchain in the LSB, while other nodes take a centralized management method with the OBM as a center. Such network is referred to as an overlay network.

In particular, the blockchain may also be used in the platooning technology of a plurality of vehicles. If a plurality of vehicles are platooning, the vehicles can form a network and drive maintaining a constant distance therebetween. The vehicles formed to be a platoon may receive surrounding information through V2X (Vehicle to Everything) communication and use it for safe driving. In the platooning, a leading vehicle 1410 may be referred to as a LV (Leading Vehicle) and following vehicles 1420, 1430, 1440, 1450 following the LV may be referred to as Slave Vehicles (SVs) or Following Vehicles (FVs). In the specification, Leading Vehicle and "Leader Vehicle" may be used in place of each other, and Slave Vehicle or Flowing Vehicle and "child vehicle" may be used in place of each other.

At this time, a plurality of vehicles platooning in a platooning system using a blockchain may be regarded as blockchain nodes. The vehicles block data generated therefrom and transmit it to another platooning vehicle, and the data generated may also be transferred to a cloud server or a Mobile Edge Computing Server (MEC server). As a result, the original data can be checked through the cloud server or the MEC server even if at least one vehicle that is currently platooning or has ever platooned in the past is hacked, or even if data is falsified by a user.

At this time, a method of the transmission and reception of data between platooning vehicles may include broadcast, groupcast, unicast, or the like.

In an example of the invention, the blockchain system may include a blockchain network (BCN), and a server.

The blockchain network (BCN) may be configured with at least one node. The node may be a server 1460, a vehicle or an IoT apparatus other than these. Each node records information based on preset rules, transmits the recorded information to each blockchain server 1460, while at the same time the server 1460 can store and manage the information received. Each of the nodes may mean an autonomous vehicle.

In various examples of the invention, the node may not only record information based on preset rules, but also perform a function of the server 1460. Specifically, each node may add program codes to perform a function of generating and storing data.

In an example of the invention, the sever 1460 may include the cloud sever or the MEC server. The server 1460 may receive the transaction information from the vehicle to store and manage it. The transaction information may mean information about various events performed based on the blockchain. In particular, the transaction in the invention may be an event related to internal and external information of the autonomous vehicle which the autonomous vehicle has obtained through a sensing unit.

In a case where a network of autonomous vehicles provided with a blockchain like this is used, the internal and external information of the vehicles obtained from the each vehicle may be replicated, shared or synchronized in the server 1460 or a memory of another vehicle. Due to sharing of such information, the vehicle may effectively respond to information fabrication by an outside hacker or information fabrication of the user.

Figure 15:
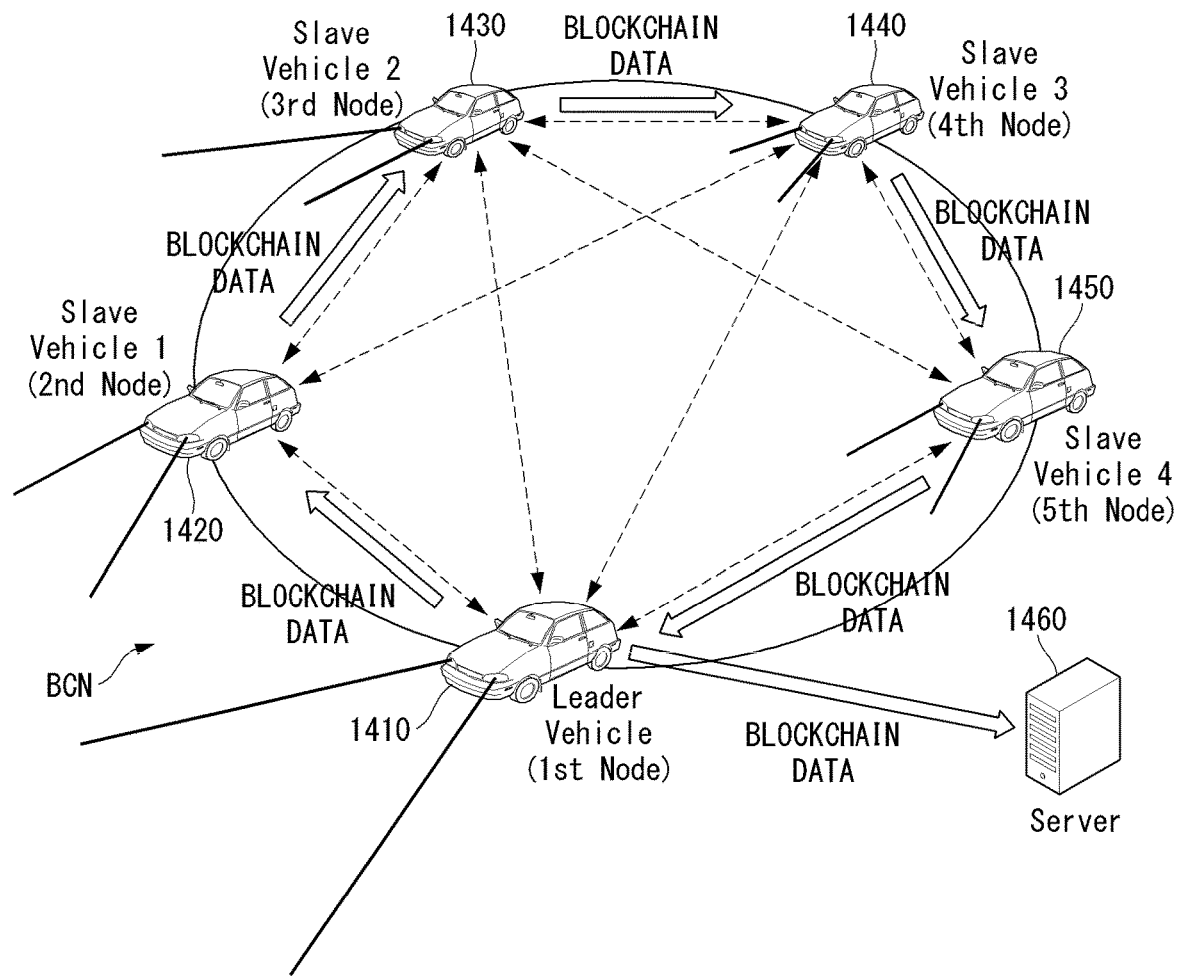
FIG. 15 is a diagram illustrating an example of a situation in which a platooning vehicle transmits/receives data using a blockchain network according to an embodiment of the present disclosure.

FIG. 15 is a diagram illustrating an example of a situation in which a platooning vehicle transmits/receives data using a blockchain network according to an embodiment of the present disclosure.

The platooning vehicle may include a leading vehicle 1410 and slave vehicles 1420, 1430, 1440, 1450, . . . . The platooning is a technology of clustering several vehicles into one network and allowing the vehicles to drive with a constant distance from each other. The clustered vehicles may acquire surrounding information through V2X communication and use the acquired information for safe driving. The platooning has advantages of improving fuel efficiency, reducing driver fatigue, and improving road utility and the like, compared to general autonomous driving.

According to one embodiment of the present disclosure, the leading vehicle 1410 may receive a genesis block from a server 1460, and encrypt external image information acquired through a camera of a vehicle and add the encrypted external image information to a block in order to prevent forgery of a black box. At this time, the genesis block may be generated by a vehicle unique number and a hash value of a vehicle encrypted with a V2X key.

According to another embodiment of the present disclosure, the leading vehicle 1410 receive the genesis block from the server 1460, encrypt information and the like on a horizontal angle and a vertical angle which may form and transmit driving information, vehicle information, V2X communication distance information, and millimeter wave (mmWave) of the leading vehicle 1410 itself and adds the encrypted information and the like to a block, configure a blockchain, and transmit the blockchain to the slave vehicles 1420, 1430, 1440, 1450, . . . . In this case, the driving information may include positional information, lane information, speed information, and the like of a vehicle. In addition, the vehicle information may include size information of a vehicle body, radius information of a wheel, information on a type of mounted sensors mounted and attachment positions of each sensor, measurement area information of radar and lidar, transmission power of the sensors, and the like.

According to one embodiment of the invention, the platooning vehicle may form a blockchain network (BCN). In particular, a routing table is created before a vehicle forms the blockchain network (BCN). At this time, driving data of the vehicle may be used.

In detail, at least one vehicle that performs the platooning may create the routing table based on driving data. The driving data may include a location where the platooning vehicle is separated from a platoon, the amount of fuel remaining in the vehicle, a year model of the vehicle, a size of the vehicle, a type of the vehicle, a position of the vehicle in the platoon, and the like. For example, as a location where a specific vehicle is separated from the platoon is close to a current position, the specific vehicle is preferentially excluded from the platoon. At this time, the routing table is created so that the excluded vehicle is positioned in a lower ranking in a routing sequence. In another example, if the amount of fuel remaining in the vehicle is small, it may be positioned in the lower ranking of the routing table because the vehicle needs to be refueled out of the platoon. In addition, when it is determined that the vehicle is difficult to continue platooning in consideration of the year model, size, type, and the like of the vehicle, when it is expected that the vehicle is preferentially excluded from the platoon, or when the vehicle is determined to be unsafe from external hacking, the leading vehicle may create a routing table based on driving data related to a separation order from the platoon. Accordingly, a vehicle that stays in the platoon for a long time may be placed in a higher ranking in the routing table, and a vehicle which is expected to be separated from the platoon first may be placed in a lower ranking in the routing table.

That is, according to the embodiment of the present disclosure, the staying time within the platoon of at least one vehicle performing the platooning may be determined based on the driving data, a vehicle scheduled to be relatively first separated from the platooning based on the determined staying time may be placed in the routing sequence of the lower ranking, and a vehicle scheduled to be relatively later separated from the platoon may be placed in the routing sequence in the previous ranking. By forming the routing table, a vehicle stays in the platoon for a long time and a reliable vehicle is guaranteed as a first node vehicle, so the security of the blockchain data can be improved. In addition, by determining the routing sequence in the order that the vehicle stays in the platoon for a long time, it is possible to prevent the chain from floating on the way due to the exclusion of the node from the middle of the blockchain.

According to various embodiments of the present disclosure, the routing table may be updated continuously or when a specific event occurs. For example, the routing table may be updated when a new vehicle is added to the platoon or the existing vehicle is separated. According to another example, the routing table may be updated when the external information which may cause a significant change in the driving of the vehicle is acquired by the camera. According to another example, the rounding table may be updated at a predetermined period. For example, like in a case where a vehicle is cut off due to causes such as a falling rock or a case where a vehicle is obstructed to drive on a road due to a traffic accident, when an event which causes or is highly likely to cause a driving danger based on the external information of the vehicle acquired by the camera of the vehicle occurs, the routing table may be newly updated.

When the routing table is created, the leading vehicle 1410 may transmit the routing table to the slave vehicles 1420, 1430, 1440, 1450, . . . , and each vehicle serves as a node of the blockchain network (BCN) and form the blockchain network (BCN) between each node in accordance with the routing order.

The blockchain network (BCN) may be formed in such a manner that each node passes its own encrypted data and hash value to the next node, and each node transmits its own encrypted data and hash value to the encrypted data and hash value received from a previous node. Each vehicle receives all blockchain data received from other vehicles and stores the blockchain data in the block In this case, each vehicle may check the hash values of the previous node and the next node to check whether the blockchain data of the specific node is modulated or hacked. If it is checked that a specific node is not modulated with, the block is transmitted to the next node in order to form the blockchain network (BCN).

According to various embodiments of the present disclosure, the driving data, data about the sensing unit of the vehicle, data about the autonomous driving control of the vehicle, data about an external object obtained by the camera of the vehicle, or the like may be encrypted in the block.

The vehicle corresponding to the node which is the last order of the blockchain may transmit the blockchain data back to the leading vehicle 1410 or the first ranking vehicle of the routing table again. Thereafter, the leading vehicle 1410 or the first ranking vehicle of the routing table may transmit the blockchain data to the server 1460, and the server 1460 may store the blockchain data in a memory and use the stored blockchain data as evidence in a future accident.

Figure 16:
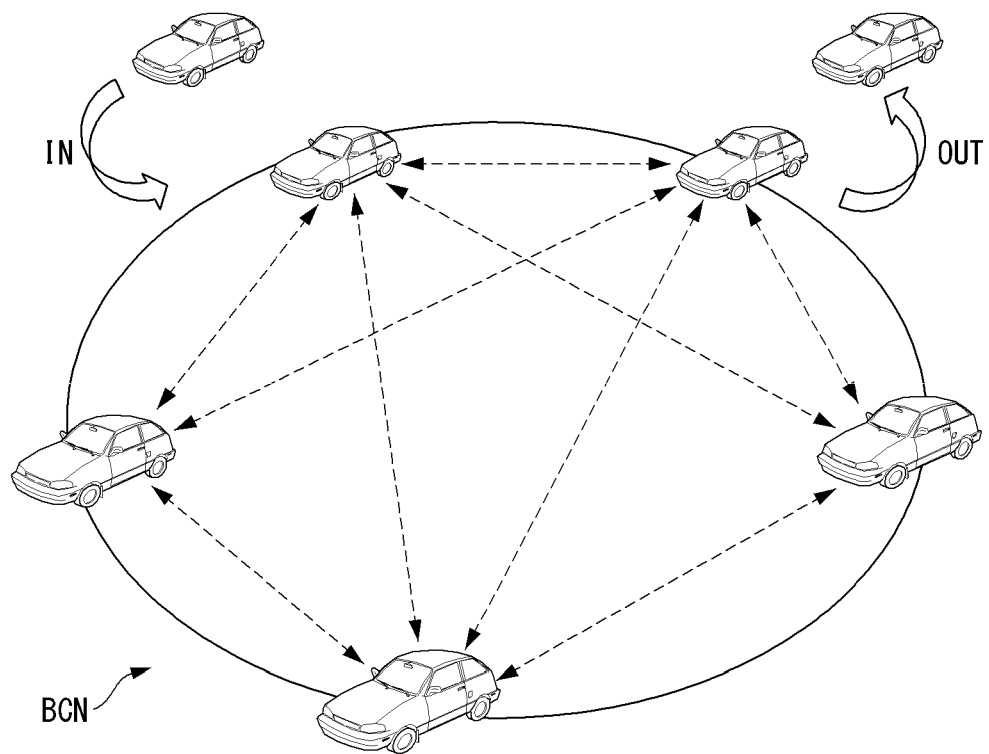
FIG. 16 is a diagram illustrating an example in which a vehicle constituting the blockchain network according to the embodiment of the present disclosure is added or removed.

FIG. 16 is a diagram illustrating an example in which a vehicle constituting the blockchain network (BCN) according to the embodiment of the present disclosure is added or removed.

Referring to FIG. 16, at least one vehicle constituting the platoon during the platooning may be separated or newly added. Accordingly, the blockchain network (BCN) formed of at least one vehicle also needs to be reconfigured. At this time, the leading vehicle 1410 may recreate the routing table and form the blockchain again.

According to one embodiment of the invention, the vehicle may be excluded from the blockchain network (BCN). In detail, a vehicle that is determined to be separated from the cluster or hacked by the outside may be excluded from the blockchain network (BCN). In this case, the blockchain data of the excluded vehicle is transmitted to the server 1460 and stored in the server 1460. At this time, the server 1460 may record the time when the vehicle is excluded from the blockchain network (BCN) together, and may use the recorded time as evidence when an accident occurs.

In addition, when a vehicle is separated from the platooning, the separated vehicle may transmit a message about the separation from the platoon to all the vehicles constituting the platoon by broadcast, and may be separated from the platoon. At this time, the separated vehicle is excluded from the routing table.

When a vehicle is excluded from the blockchain network (BCN), all vehicles other than the excluded vehicle may delete the blockchain data of the separated vehicles previously stored by each vehicle, recreate a routing table between surviving vehicles, and form the blockchain.

Figure 17:
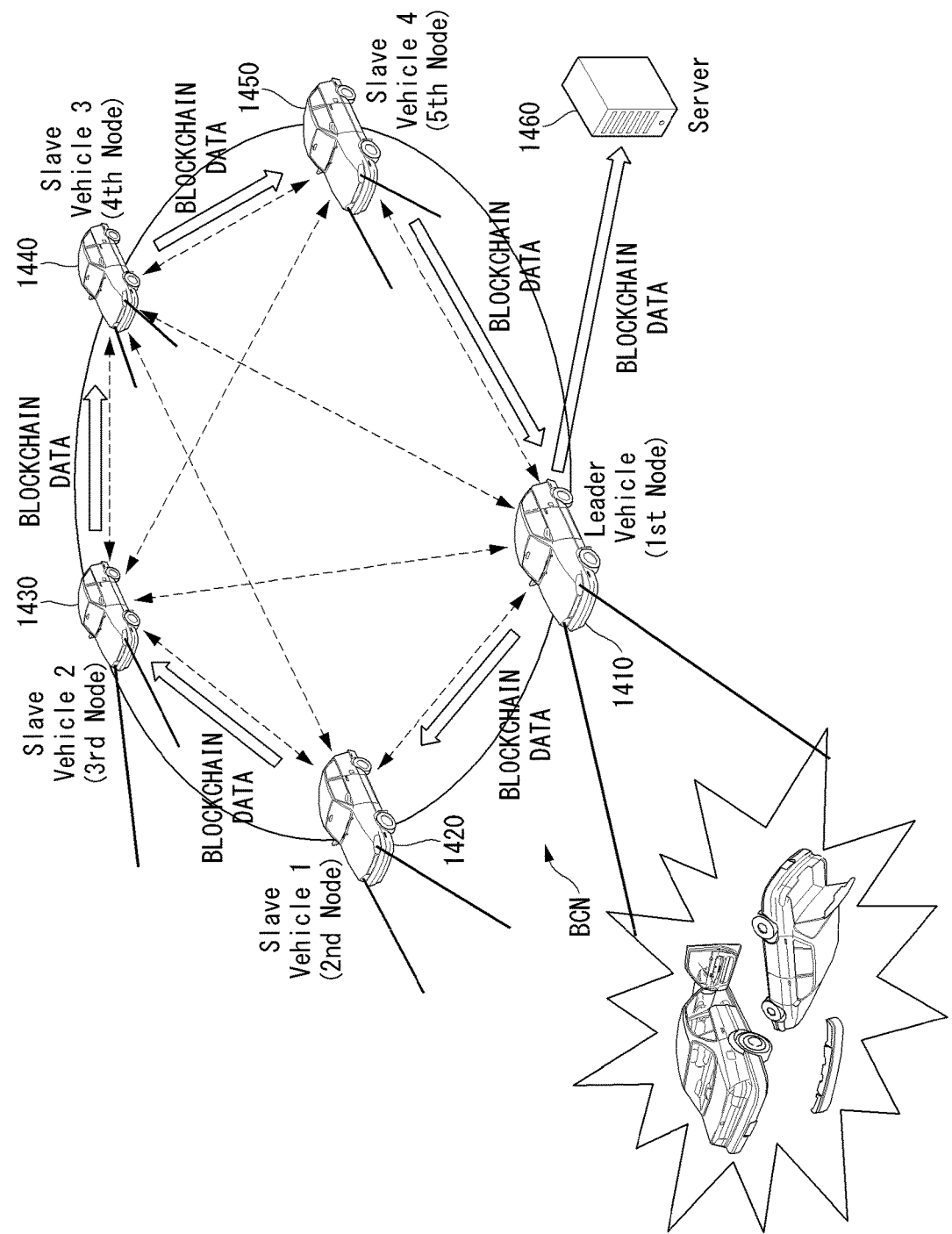
FIG. 17 is a diagram illustrating a case in which a danger of a road is detected during the platooning of a vehicle based on the blockchain according to the embodiment of the present disclosure.

FIG. 17 is a diagram illustrating a case in which a danger of a road is detected during the platooning of a vehicle based on the blockchain according to the embodiment of the present disclosure.

Referring to FIG. 17, a dangerous object or a dangerous situation of a road may be detected by a camera of at least any one platooning vehicle. In this case, a vehicle corresponding to a node configured as the blockchain network (BCN) may transmit a block including image data about the dangerous situation to another vehicle and share the block with another vehicle.

According to various embodiments of the present disclosure, the speed at which the blockchain is formed may vary in specific situations. For example, when the event which causes or is highly likely to cause the driving danger based on the external information of the vehicle acquired by the camera of the vehicle occurs, a degree of danger may be classified into a plurality of levels, and a generation speed of the blockchain may be controlled according to a danger level.

In addition, according to one embodiment of the present disclosure, when the leading vehicle 1410 identifies the event which causes or is highly likely to cause the driving danger, the leading vehicle 1410 may transmit the blockchain data to the server 1460 at that time. If there is the event that causes the danger, the vehicle may cause or may be highly likely to cause a vehicle accident. In this case, the block data of the vehicle may be hacked, and a user may arbitrarily manipulate the driving data of the vehicle when an accident occurs due to a user's mistake. Accordingly, the vehicle may transmit the blockchain data to the server 1460 when the event causing such a danger occurs, and the blockchain data stored in the server 1460 may be used as evidence related to an accident later.

At this time, the event that causes or is highly likely to cause the driving danger may include the dangerous situation in which a collision of a vehicle occurs on a road, the situation where the platooning vehicle does not respond to the control signal of the leading vehicle 1410, the situation in which it is determined that the blockchain data are modulated, or the like.

According to various embodiments of the present disclosure, when it is determined that the vehicle is hacked, the hacked vehicle, the leading vehicle 1410, and the server controlling the autonomous driving may take various measures for the safety of the hacked vehicle and the road.

The hacked vehicle may transmit its own positional information to the control server by itself and move to a safe location. In addition, software to defend against hacking may be requested to the server and installed in the server.

The leading vehicle 1410 may move the vehicle to a position where a collision does not occur in the platooning based on the information of the hacked vehicle.

The control server may transmit a control signal to the hacked vehicle through the RSU and the leading vehicle 1410, release the platooning, or move the vehicle to a safe location and stop the vehicle.

Figure 18:
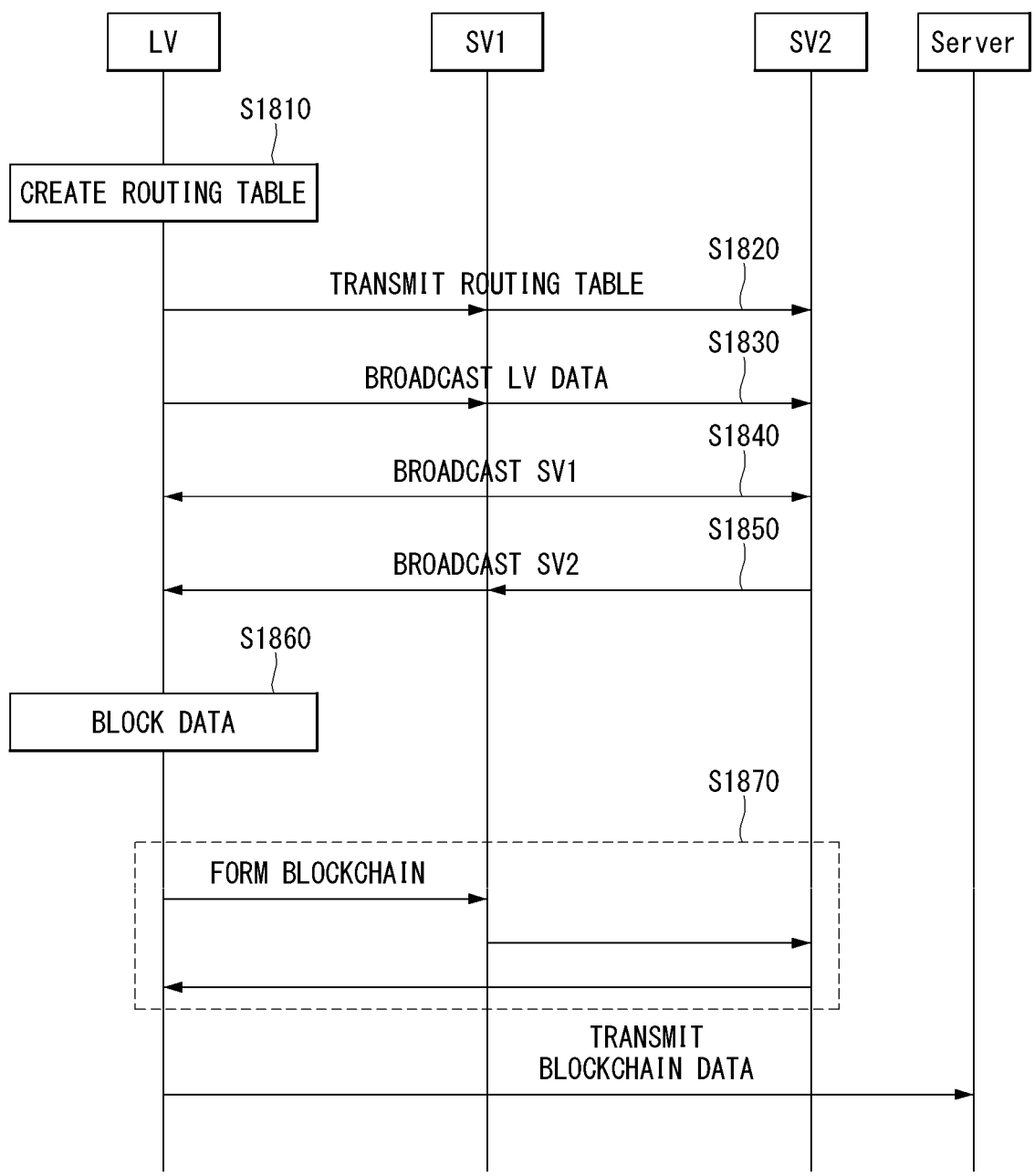
FIG. 18 is a sequence diagram illustrating a method for forming a blockchain network of a platooning vehicle according to an embodiment of the present disclosure.

FIG. 18 is a sequence diagram illustrating a method for forming a blockchain network of a platooning vehicle according to an embodiment of the present disclosure.

Referring to FIG. 18, first, the leading vehicle 1410 may create the routing table (S1810). The routing table may be created based on the driving data of at least one platooning vehicle, and may be recreated when a vehicle constituting the platooning is added or deleted. In addition, the routing table may be recreated even when an event which may cause a vehicle accident occurs.

The leading vehicle 1410 may transmit the routing table to the slave vehicles 1420, 1430, 1440, 1450, . . . constituting the platooning, and each vehicle constituting the platooning may transmit data to be included in the block to each other by broadcast (S1820, S1830, S1840, and S1850).

The leading vehicle 1410 may block data of each vehicle received by broadcast (S1860).

Each platooning vehicle may form a block chain by inputting a block to a hash function in a routing order and transferring the output hash value and the corresponding block to a vehicle in the next sequence (S1870).

The leading vehicle 1410 may transmit the blockchain data received from the vehicle in the last order of the routing table to the server 1460 (S1880). The server 1460 may receive and store the corresponding data, and may use the received and stored data as evidence when an accident occurs later.

Figure 19:
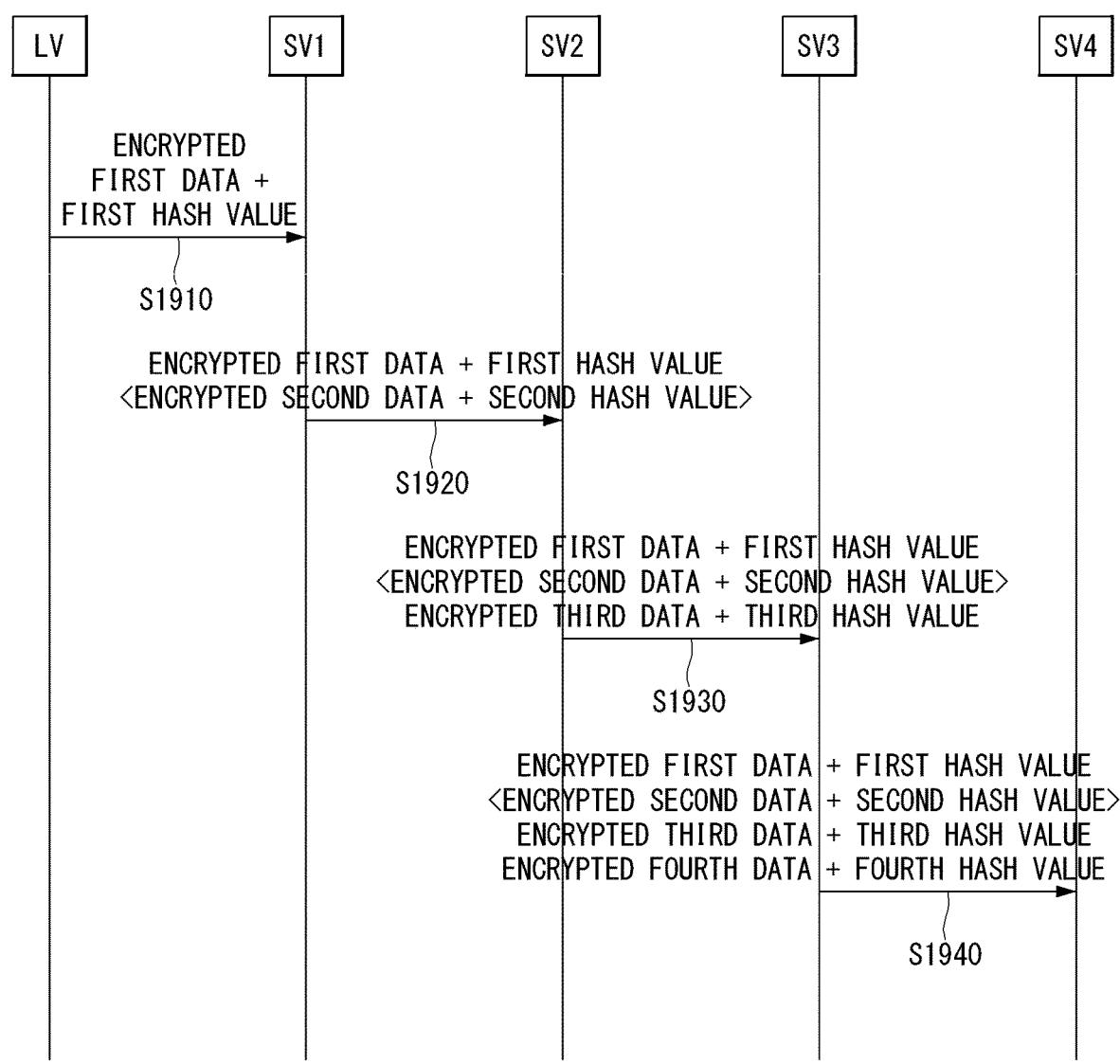
FIG. 19 is a diagram illustrating a method for detecting modulated data based on a blockchain according to an embodiment of the present disclosure.

FIG. 19 is a diagram illustrating a method for detecting modulated data based on a blockchain according to an embodiment of the present disclosure.

Referring to FIG. 19, first, a leading vehicle LV inputs encrypted first data into a hash function and transmits the output first hash value and the "encrypted first data" to a first slave vehicle SV1 (S1910).

The first slave vehicle SV1 may receive "encrypted first data+first hash value" and input "first data+first hash value+encrypted second data" to a hash function to transmit the output second hash value and "encrypted first data+first hash value+encrypted second data" to a second slave vehicle SV2 (S1920).

The second slave vehicle SV2 may receive "encrypted first data+first hash value+encrypted second data+second hash value" and input "encrypted first data+first hash value+encrypted second data+second hash value+encrypted third data" to a hash function to transmit the output third hash value and "encrypted first data+first hash value+encrypted second data+second hash value+encrypted third data" to a third slave vehicle (SV3) (S1930).

The third slave vehicle SV3 may receive "encrypted first data+first hash value+encrypted second data+second hash value+encrypted third data+third hash value" and input "encrypted first data+first hash value+encrypted second data+second hash value+encrypted third data+third has value+encrypted fourth data" to a hash function to transmit the output fourth hash value and "encrypted first data+first hash value+encrypted second data+second hash value+encrypted third data+encrypted fourth data" to a fourth slave vehicle (S1940).

In this case, it may be determined whether the hash value of the second slave vehicle SV2 is modulated based on the second hash value stored in the first slave vehicle SV1 and the second hash value stored in the third slave vehicle SV3. For example, when the second data of the second slave vehicle SV2 are modulated and the modulated second hash value is output, it may be determined that the data of the second slave vehicle SV2 are modulated based on the second hash values of the first slave vehicle SV1 and the third slave vehicle SV3

According to various embodiments of the present disclosure, the blockchain data may be checked at a predetermined period, and when the check is performed, the leading vehicle LV may transmit the blockchain data to the server 1460.

In this case, when it is determined that the blockchain data of the platooning vehicle continuously transmit the modulated data, the vehicle continuously transmitting the modulated data may be determined as a hacked vehicle. Therefore, the leading vehicle LV may set a vehicle transmitting continuously modulated data as a lower ranking in the routing table.

Furthermore, when the vehicle transmitting the continuously modulated data is determined to continuously transmit the modulated data even if it is positioned at the last ranking of the routing table, the leading vehicle LV may exclude the vehicle from the blockchain network (BCN).

According to various embodiments of the present disclosure, when it is determined that blockchain data of a specific vehicle are modulated, the leading vehicle LV or the specific vehicle may request blockchain data before being modulated by the server 1460 and may update the blockchain data determined to be modulated based on the blockchain data before modulated.

Figure 20:
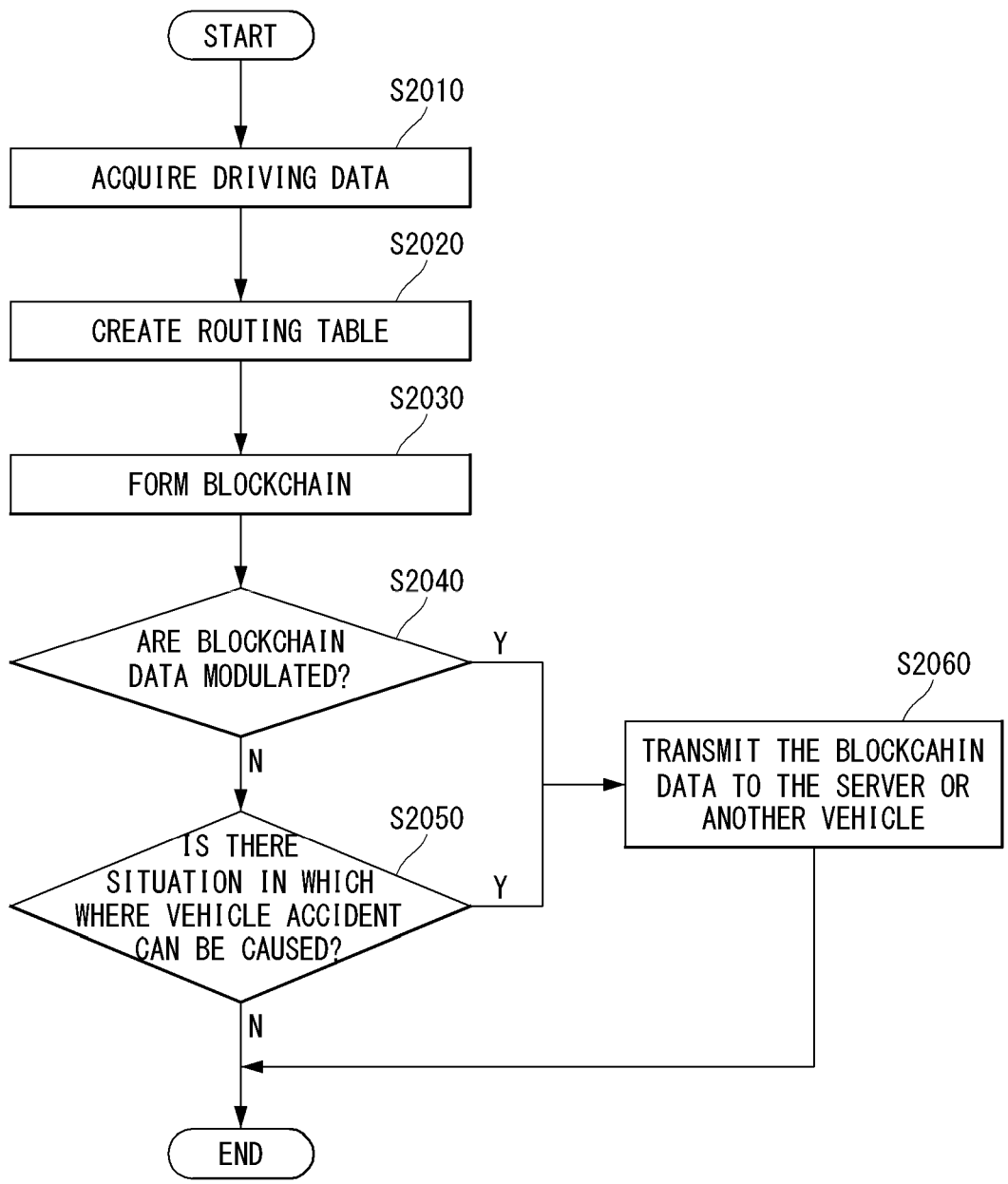
FIG. 20 is a flowchart illustrating a method for identifying modulated data based on a blockchain according to an embodiment of the present disclosure.

FIG. 20 is a flowchart illustrating a method for identifying modulated data based on a blockchain according to an embodiment of the present disclosure.

Referring to FIG. 20, first, the leading vehicle LV may acquire driving data, and form a routing table based on the driving data (S2010 and S2020). In detail, the leading vehicle LV may acquire the driving data, and determine a staying time within a platoon of a plurality of vehicles based on the driving data. At this time, a vehicle expected to stay for a long time based on the determined staying time sets the routing sequence as a higher ranking, and a vehicle expected to stay for a short time sets the routing sequence as a lower ranking.

The platooning vehicles configured as the leading vehicle LV and the slave vehicle may form a block chain (S2030).

Each vehicle constituting the leading vehicle LV or the blockchain may check whether the blockchain data is modulated (S2040). In detail, a vehicle executes blockchain agreements between a plurality of platooning vehicles participating in a blockchain exchange for distributing event information relate to vehicle operation, and identify the blockchain data being modulated by comparing a hash value of second block with hash values of the first and third blocks in response to the execution of blockchain agreements. the second block is the block which is subject to data modulating inspection, the first and the third blocks are closest blocks to the second block based on the routing sequence.

In this case, it is possible to identify a vehicle in which data are modulated by comparing a hash value of a block in a previous order with a hash value of a block in a subsequent order.

Each vehicle constituting the leading vehicle LV or the blockchain may determine whether there is a situation in which an accident of a vehicle may be caused (S2050). Vehicles can acquire external information by a camera and detect external dangers based on the acquired external information.

When it is determined that the blockchain data are modulated or that there is the situation in which the accident of the vehicle may be caused, the leading vehicle LV may transmit the blockchain data to the server 1460 or another vehicle (S2060).

Figure 21:
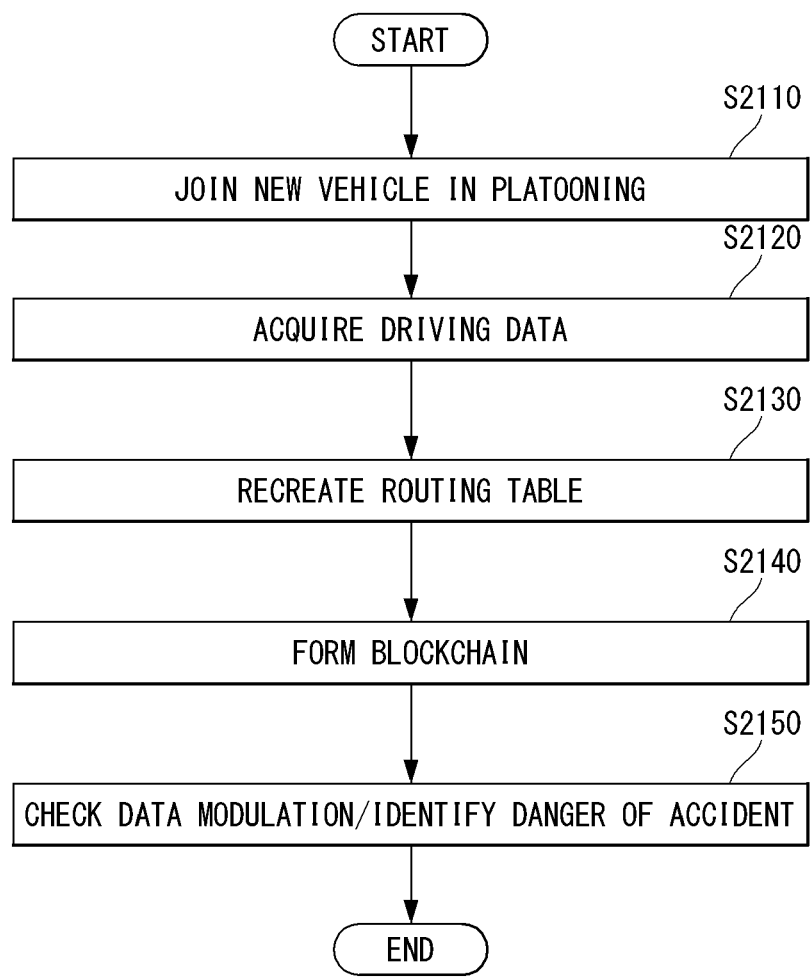
FIG. 21 is a flowchart illustrating a method for reconfiguring a blockchain network according to an embodiment in the present disclosure.

FIG. 21 is a flowchart illustrating a method for reconfiguring a blockchain network (BCN) according to an embodiment in the present disclosure.

Referring to FIG. 21, first, a blockchain system may determine whether a new vehicle joins a platoon (S2110).

In this case, a new vehicle may transmit a message requesting the joining into the platoon to the leading vehicle LV, and the leading vehicle LV may determine a position in the platoon of the new vehicle and transmit a message allowing the joining into the platoon to the new vehicle.

The leading vehicle LV may acquire driving data of each vehicle performing autonomous driving and recreate the routing table (S2120 and S2130).

Each vehicle performing the autonomous driving may form the blockchain and may identify the modulation of data or the danger of accident occurrence on a road based on the blockchain (S2140).

In some implementations, a vehicle-to-vehicle basic operation may use 5G communication.

The first vehicle transmits specific information to the second vehicle (S61).

The second vehicle transmits a response to specific information to the first vehicle (S61).

Here, the specific information and the detailed contents related to the transmission and reception of the response to the specific information may refer to the contents disclosed in paragraph M describing the operation of the V2X communication, and can be applied with combined with the contents disclosed in FIG. 8 and the paragraph M.

On the other hand, the configuration of the vehicle-to-vehicle application operation may vary depending on whether the 5G network is directly (sidelink communication transmission mode 3) or indirectly (sidelink communication transmission mode 4) involved in the resource allocation of the specific information and the response to the specific information.

Figure 22:
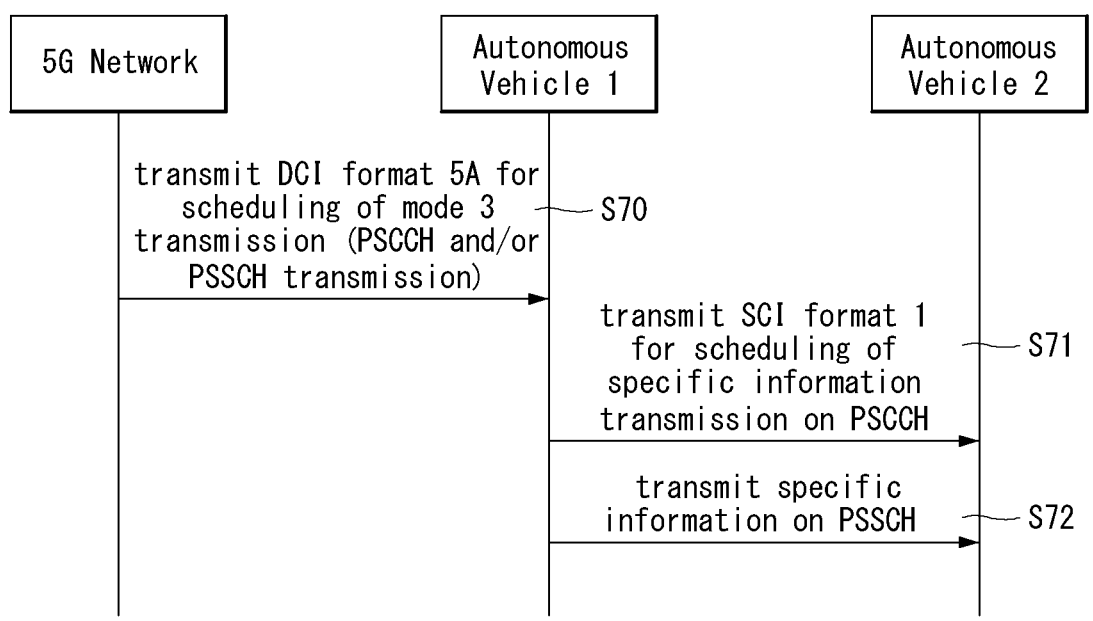
FIGS. 22 and 23 are exemplary diagrams illustrating an example of a vehicle-to-vehicle application operation using 5G communication.
Figure 23:
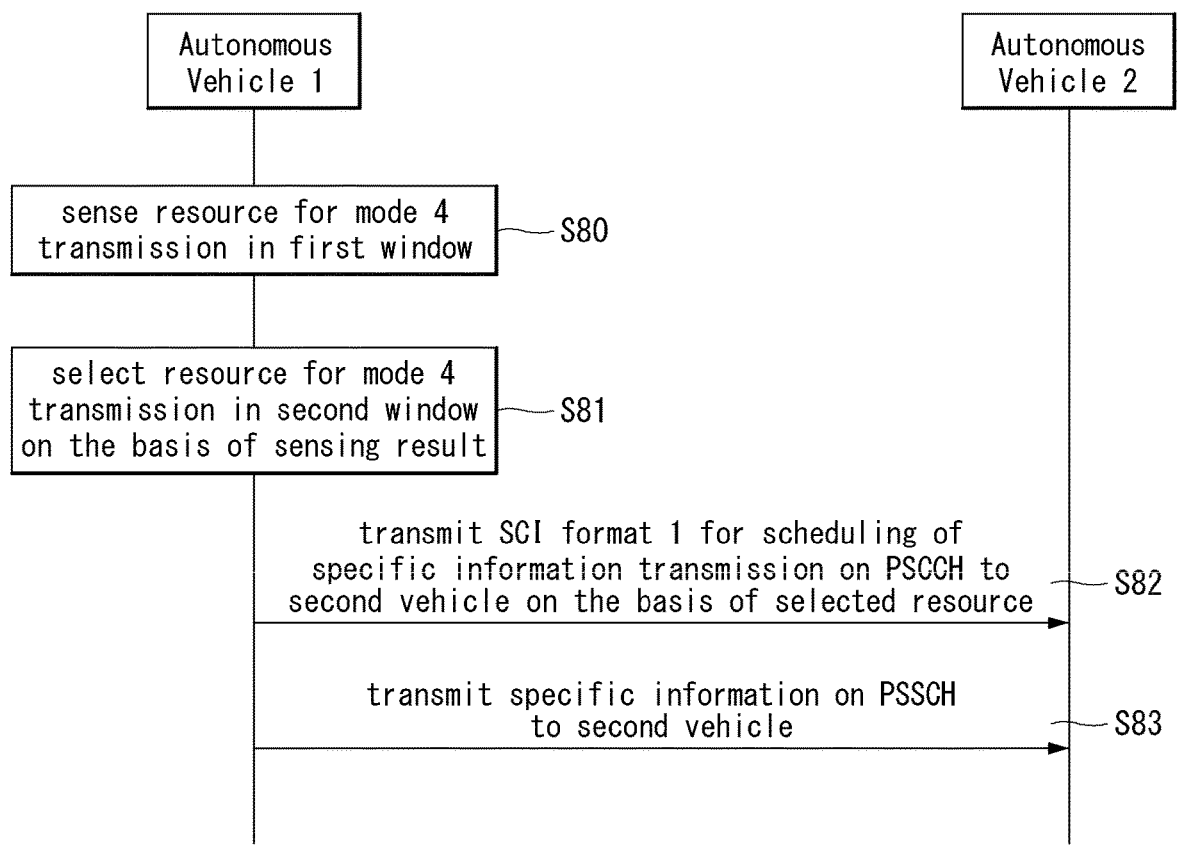

FIGS. 22 and 23 are exemplary diagrams illustrating an example of a vehicle-to-vehicle application operation using 5G communication.

FIG. 22 shows an embodiment in which a 5G network is directly involved in resource allocation of signal transmission/reception.

The 5G network may transmit DCI format 5A for scheduling of mode 3 transmission (PSCCH and/or PSSCH transmission) to the first vehicle (70).

Here, physical sidelink control channel (PSCCH): 5G physical channel for scheduling of specific information transmission, physical sidelink shared channel (PSSCH): 5G physical channel for transmitting specific information.

The first vehicle transmits SCI format 1 for scheduling of specific information transmission to the second vehicle on the PSCCH (S71).

The first vehicle transmits specific information to the second vehicle on PSSCJ (S72).

FIG. 23 shows an embodiment in which a 5G network is indirectly involved in resource allocation of signal transmission/reception.

Referring to FIG. 23, the first vehicle senses a resource for mode 4 transmission in a first window (S80).

The first vehicle selects a resource for mode 4 transmission in a second window based on the sensed result (S81).

Here, the first window means a sensing window and the second window means a selection window.

The first vehicle transmits SCI format 1 for scheduling of specific information transmission to the second vehicle on the PSCCH based on the selected resource (S82).

The first vehicle transmits specific information to the second vehicle on PSSCH (S83).

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for controlling platooning vehicles in an autonomous driving system, comprising:
    acquiring driving data of a plurality of platooning vehicles;
    determining a staying time in a platoon of the vehicles based on the driving data;
    creating a routing table including a routing sequence for transmitting blockchain data between the plurality of vehicles according to the staying time;
    transmitting the created routing table to a slave vehicle;
    forming a blockchain between the plurality of vehicles according to the routing sequence;
    executing blockchain agreements between a plurality of platooning vehicles participating in a blockchain exchange for distributing event information relate to vehicle operation, and
    identifying the blockchain data being modulated by comparing a hash value of second block with hash values of the first and third blocks in response to the execution of blockchain agreements,
    wherein the second block is the block which is subject to data modulating inspection, the first and the third blocks are closest blocks to the second block based on the routing sequence.

2. The method of claim 1, wherein the driving data includes at least one of a position at which the vehicle is separated from the platoon, an amount of fuel remaining in the vehicle, a year model of the vehicle, a size of the vehicle, a type of the vehicle, or a position of the vehicle in the platoon.

3. The method of claim 1, wherein in the block, at least one of the driving data, sensing data of the vehicle, autonomous driving control data of the vehicle, or external object data acquired by a camera of the vehicle is encrypted.

4. The method of claim 1, wherein the forming of the blockchain includes:
transmitting and receiving the driving data between the plurality of vehicles;
encrypting the driving data of a leading vehicle with a V2X key;
calculating the hash value based on the encrypted driving data and forming the block formed of the encrypted driving data and the hash value; and
transmitting the block to the vehicle corresponding to a subsequent sequence according to the routing sequence.

5. The method of claim 1, further comprising:
identifying an event which causes a hazard to driving or is highly likely to cause a hazard to driving based on external information of the vehicle which is acquired by a camera of the vehicle; and
controlling a generation speed of the blockchain according to a degree of danger when the event is identified.

6. The method of claim 5, further comprising:
transmitting the blockchain data related to the event to a server when the event is identified.

7. The method of claim 5, wherein the event includes at least one of a dangerous situation in which where the vehicle is likely to crash on a road, a situation in which where the platooning vehicles do not respond to a control signal of a leading vehicle, or a situation in which where it is determined that the blockchain data are modulated.

8. The method of claim 1, further comprising:
determining whether the blockchain data are modulated at a predetermined period and transmitting the determined blockchain data to a server.

9. The method of claim 8, wherein when the blockchain data including modulated data and consecutively transmitted, the vehicle transmitting the modulated data is determined to be a vehicle which is likely to be hacked and the routing sequence is changed to a lower ranking.

10. The method of claim 8, further comprising:
requesting unmodulated blockchain data to the server when it is determined that the blockchain data are modulated; and
updating the blockchain data, which are determined to be modulated, based on the unmodulated blockchain data.

11. The method of claim 1, further comprising:
receiving a join request message to the platoon from the new vehicle when a new vehicle join the platoon;
determining a position of the new vehicle in the platoon and transmitting the join request message to the platoon to the new vehicle; and
recreating the routing table according to the staying time in the platoon of the new vehicle.

12. The method of claim 1, further comprising:
sensing a resource for sidelink mode 4 transmission in a first window;
selecting the resource for the mode 4 transmission in a second window based on the sensed result;
transmitting SCI format 1 for scheduling of a blockchain data transmission of a leading vehicle to the slave vehicle on PSCCH based on the selected resource; and
transmitting the blockchain data of the leading vehicle to the slave vehicle on PSSCH.

13. A platooning leading vehicle constituting a blockchain, comprising:
an antenna;
a memory; and
a processor;
wherein the antenna transmits a routing table and driving data to a slave vehicle and receives the driving data from the slave vehicle, and
the processor determines a staying time in the platoon of the vehicle based on the driving data of at least one of the platooning vehicles, creates the routing table including a routing sequence transmitting blockchain data between the plurality of vehicles according to the staying time, forms a blockchain between the plurality of vehicles based on the routing sequence, executes blockchain agreements between a plurality of platooning vehicles participating in a blockchain exchange for distributing event information relate to vehicle operation, and identifies the blockchain data being modulated by comparing a hash value of second block with hash values of the first and third blocks in response to the execution of blockchain agreements,
wherein the second block is the block which is subject to data modulating inspection, the first and the third blocks are closest blocks to the second block based on the routing sequence.

14. The platooning leading vehicle of claim 13, wherein the driving data includes at least one of a position at which vehicle is separated from the platoon, an amount of fuel remaining in the vehicle, a year model of the vehicle, a size of the vehicle, a type of the vehicle, or a position of the vehicle in the platoon.

15. The platooning leading vehicle of claim 13, wherein the processor identifies an event which causes a hazard to driving or is highly likely to cause a hazard to driving based on external information of the vehicle which is acquired by a camera of the vehicle, and controls a generation speed of the blockchain according to a degree of danger when the event is identified.

16. The platooning leading vehicle of claim 15, wherein when the processor identifies the event, the antenna transmits the blockchain data related to the event to a server.

17. The platooning leading vehicle of claim 13, wherein the processor determines whether the blockchain data are modulated at a predetermined period, and
the antenna transmits the determined blockchain data to a server.

18. The platooning leading vehicle of claim 13, wherein when the blockchain data of the platooning vehicle are consecutively modulated and transmitted, the processor determines the vehicle transmitting the modulated data to be a vehicle which is likely to be hacked and changes the routing sequence to a lower ranking.

19. The platooning leading vehicle of claim 13, wherein the antenna requests unmodulated blockchain data to the server when the processor determines that the blockchain data are modulated, and
the memory updates and stores the blockchain data determined to be modulated to the unmodulated blockchain received from the server.

* * * * *